United States Patent
Eguchi et al.

(10) Patent No.: US 6,657,792 B2
(45) Date of Patent: Dec. 2, 2003

(54) ZOOM LENS SYSTEM

(75) Inventors: Masaru Eguchi, Saitama (JP); Takayuki Ito, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/135,411

(22) Filed: May 1, 2002

(65) Prior Publication Data
US 2003/0026003 A1 Feb. 6, 2003

(30) Foreign Application Priority Data
May 8, 2001 (JP) .......................... 2001-137324
May 29, 2001 (JP) .......................... 2001-160044

(51) Int. Cl.$^7$ .............................................. G02B 15/22
(52) U.S. Cl. ...................................... 359/686; 359/684
(58) Field of Search ................................. 359/686, 684

(56) References Cited

U.S. PATENT DOCUMENTS

| | | |
|---|---|---|
| 4,917,482 A | 4/1990 | Ito |
| 4,978,204 A | 12/1990 | Ito |
| 5,305,148 A | 4/1994 | Ikemori et al. |
| 5,572,276 A | 11/1996 | Hirakawa |
| 5,572,365 A * | 11/1996 | Ito ............................ 359/677 |
| 6,028,714 A | 2/2000 | Koyama |
| 6,342,972 B1 * | 1/2002 | Yamanashi ................. 359/686 |
| 6,369,955 B1 | 4/2002 | Enomoto et al. |
| 6,480,341 B2 * | 11/2002 | Ohtake ....................... 359/686 |

FOREIGN PATENT DOCUMENTS

| | | |
|---|---|---|
| JP | 4-303809 | 10/1992 |
| JP | 6-265788 | 9/1994 |
| JP | 8-146296 | 6/1996 |
| JP | 2000-180725 | 6/2000 |
| JP | 2000-275518 | 10/2000 |
| JP | 2001-235680 | 8/2001 |
| JP | 2001-337274 | 12/2001 |

OTHER PUBLICATIONS

English Language Abstract JP 8–146296.
English Language Abstract of JP 2000–275518.
English Language Abstract of JP 2001–235680.
English Language Abstract of JP 2001–337274.

* cited by examiner

Primary Examiner—Scott J. Sugarman
Assistant Examiner—Deborah A. Raizen
(74) Attorney, Agent, or Firm—Greenblum & Bernstein, P.L.C.

(57) ABSTRACT

A zoom lens system includes a first lens group, a second lens group, a third lens group, and a fourth lens group. Zooming is performed by moving each of the first through fourth lens groups in the optical axis direction, and the zoom lens system satisfies the following conditions:

$$1.1 < f_{23T}/f_{23W} < 1.8 \quad (1)$$

$$0.2 < LD_{23W}/fw < 0.45 \quad (2)$$

$$0.01 < (D_{23W} - D_{23T})/f_T < 0.05 \quad (3)$$

wherein $f_{23W}$: the combined focal length of the second and third lens groups at the short focal length extremity; $f_{23T}$: the combined focal length of the second and third lens groups at the long focal length extremity; $LD_{23W}$: the distance between the most object-side surface of the second lens group and the most image-side surface of the third lens group at the short focal length extremity; Fw: the entire focal length of the zoom ns system at the short focal length extremity; $D_{23W}$: the axial air-distance between the second and the third lens groups at the short focal length extremity; $D_{23T}$: the axial air-distance between t e second and the third lens groups at the long focal length extremity; and $f_T$: the focal length of the entire zoom lens system at the long focal length extremity.

8 Claims, 17 Drawing Sheets

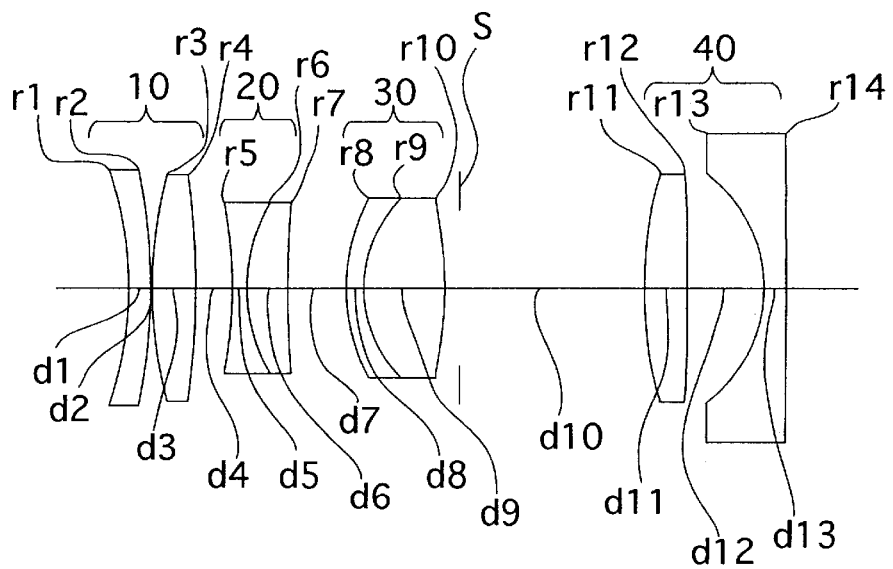

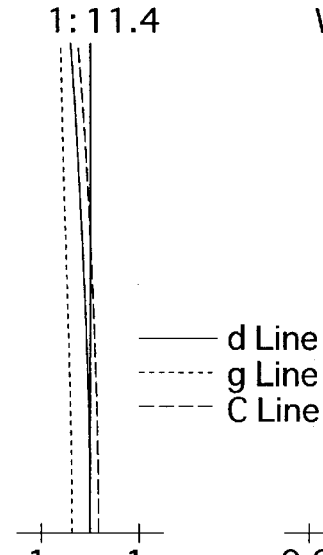
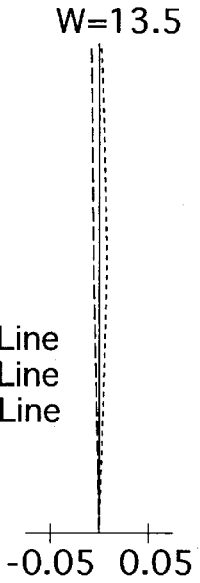
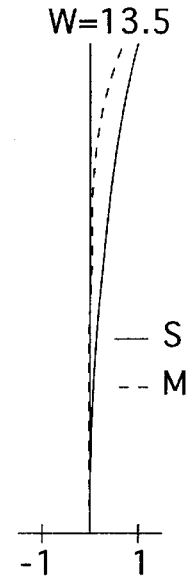
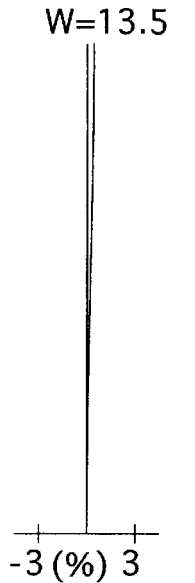
Fig. 3A  
1:11.4  
-1   1  
SPHERICAL ABERRATION  
CHROMATIC ABERRATION  
— d Line  
···· g Line  
---- C Line  
Fig. 3B  
W=13.5  
-0.05  0.05  
LATERAL CHROMATIC ABERRATION  
Fig. 3C  
W=13.5  
-1   1  
ASTIGMATISM  
— S  
-- M  
Fig. 3D  
W=13.5  
-3 (%) 3  
DISTORTION  
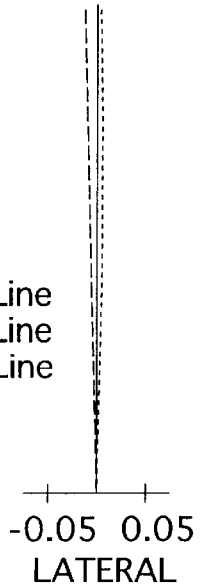
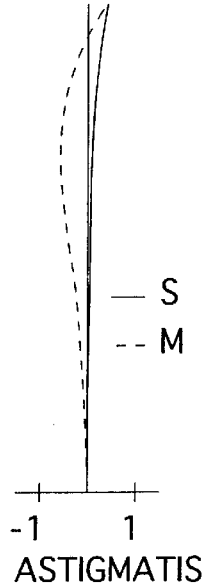
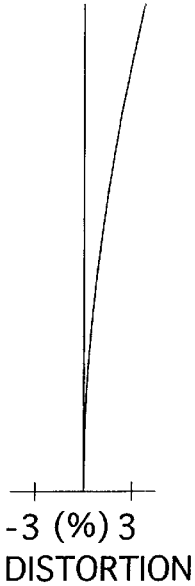
Fig. 4A  
1:9.4  
-1   1  
SPHERICAL ABERRATION  
CHROMATIC ABERRATION  
— d Line  
···· g Line  
---- C Line  
Fig. 4B  
W=13.0  
-0.05  0.05  
LATERAL CHROMATIC ABERRATION  
Fig. 4C  
W=13.0  
-1   1  
ASTIGMATISM  
— S  
-- M  
Fig. 4D  
W=13.0  
-3 (%) 3  
DISTORTION

1:14.1

— d Line
······ g Line
- - - C Line

-1    1

SPHERICAL
ABERRATION

CHROMATIC
ABERRATION

W=6.1

-0.05 0.05

LATERAL
CHROMATIC
ABERRATION

W=6.1

— S
- - M

-1    1

ASTIGMATISM

W=6.1

-3 (%) 3

DISTORTION

Fig. 6
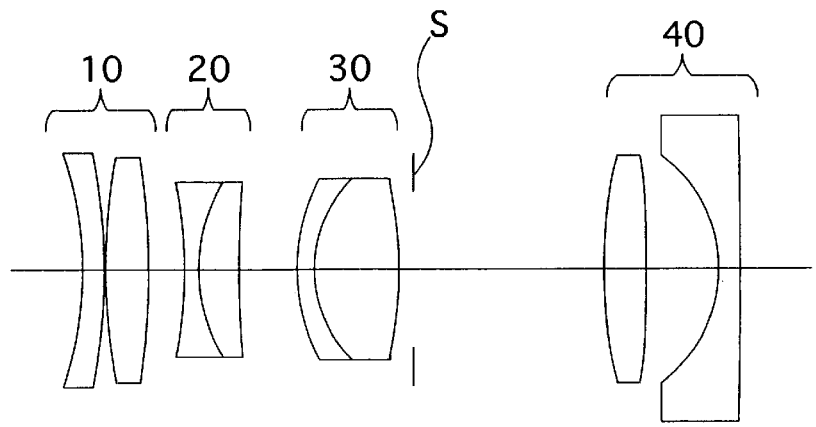
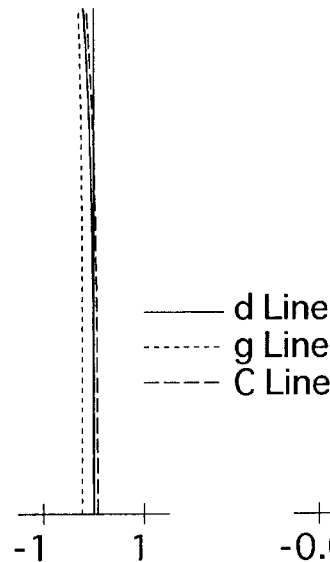
Fig. 7A
1:5.8
— d Line
······ g Line
--- C Line
-1    1
SPHERICAL
ABERRATION
CHROMATIC
ABERRATION
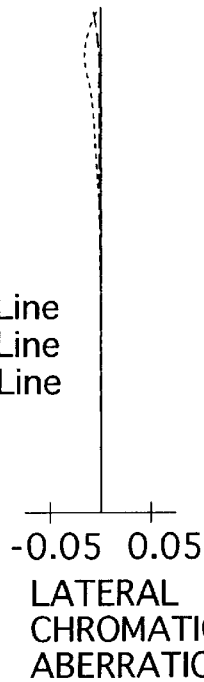
Fig. 7B
W=28.1
-0.05  0.05
LATERAL
CHROMATIC
ABERRATION
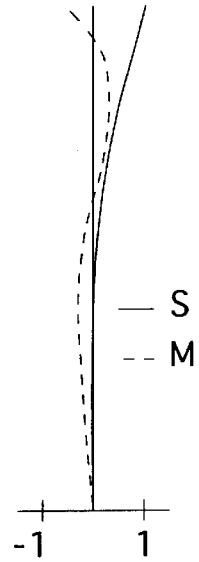
Fig. 7C
W=28.1
— S
-- M
-1    1
ASTIGMATISM
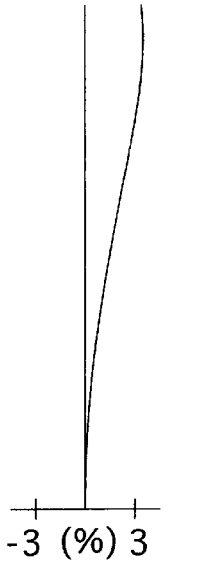
Fig. 7D
W=28.1
-3 (%) 3
DISTORTION

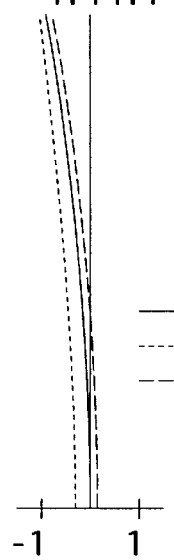
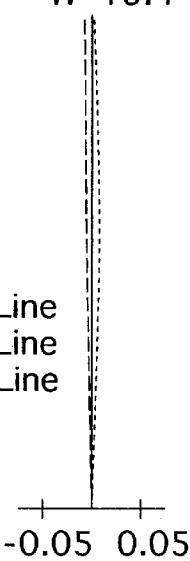
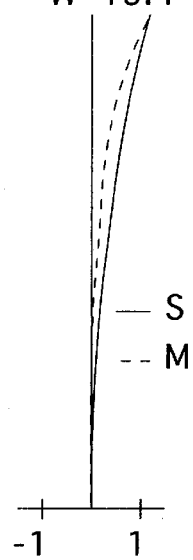
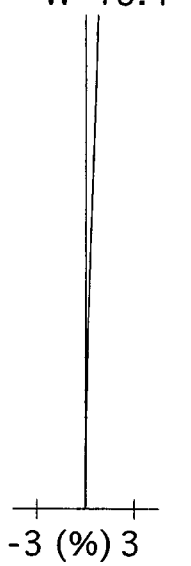
Fig. 8A 1:11.4 — SPHERICAL ABERRATION CHROMATIC ABERRATION (d Line, g Line, C Line)
Fig. 8B W=13.4 — LATERAL CHROMATIC ABERRATION
Fig. 8C W=13.4 — ASTIGMATISM (S, M)
Fig. 8D W=13.4 — DISTORTION
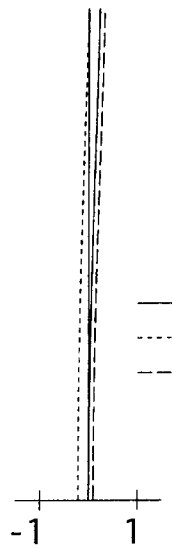
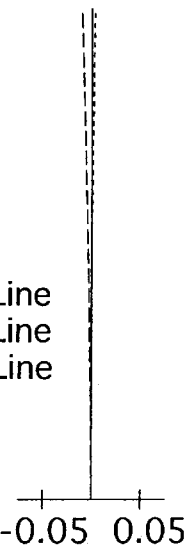
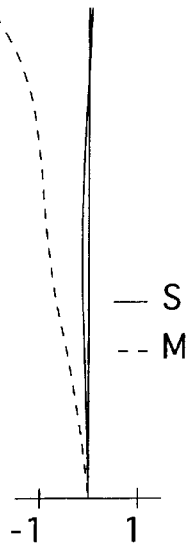
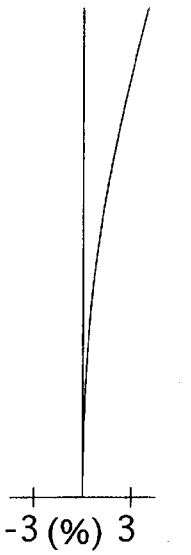
Fig. 9A 1:11.7 — SPHERICAL ABERRATION CHROMATIC ABERRATION (d Line, g Line, C Line)
Fig. 9B W=13.0 — LATERAL CHROMATIC ABERRATION
Fig. 9C W=13.0 — ASTIGMATISM (S, M)
Fig. 9D W=13.0 — DISTORTION

1:13.8

SPHERICAL
ABERRATION

CHROMATIC
ABERRATION

W=6.3

LATERAL
CHROMATIC
ABERRATION

W=6.3

ASTIGMATISM

W=6.3

DISTORTION

Fig. 11
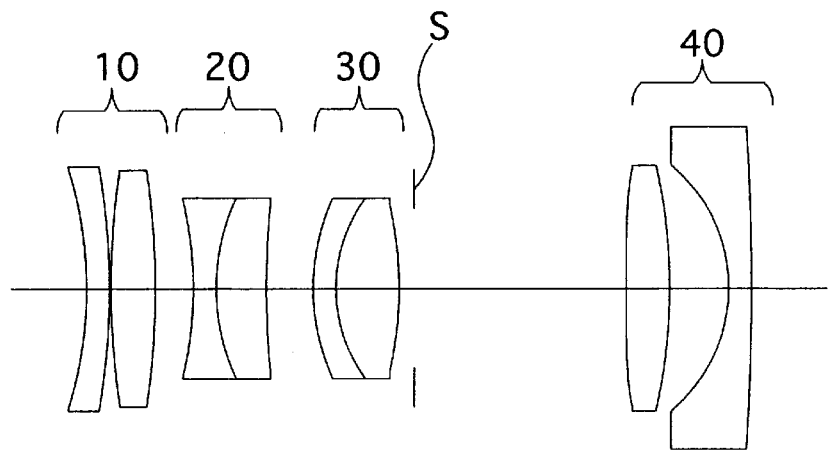
Fig. 12A
1:4.2
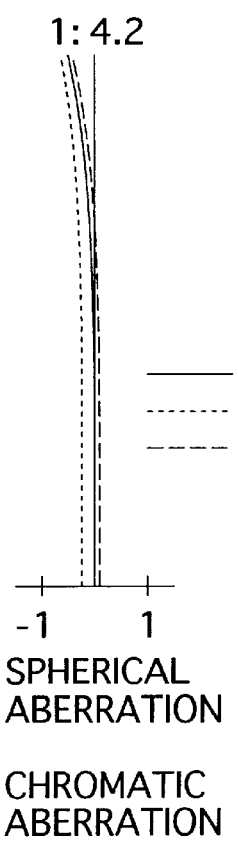
—— d Line
······ g Line
- - - C Line
-1   1
SPHERICAL
ABERRATION
CHROMATIC
ABERRATION
Fig. 12B
W=28.2
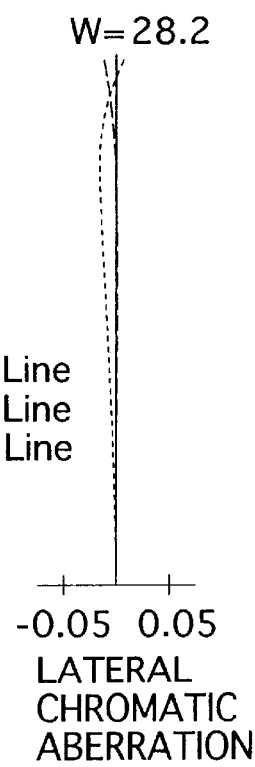
-0.05  0.05
LATERAL
CHROMATIC
ABERRATION
Fig. 12C
W=28.2
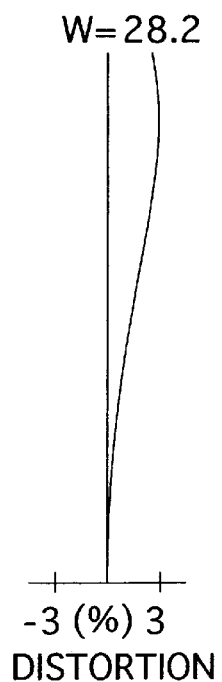
—— S
- - M
-1   1
ASTIGMATISM
Fig. 12D
W=28.2
-3 (%) 3
DISTORTION

1:8.0

-1   1

SPHERICAL
ABERRATION

CHROMATIC
ABERRATION

— d Line
······ g Line
---- C Line

W=13.4

-0.05   0.05

LATERAL
CHROMATIC
ABERRATION

W=13.4

-1   1

ASTIGMATISM

— S
-- M

W=13.4

-3 (%) 3

DISTORTION

1:8.3

-1   1

SPHERICAL
ABERRATION

CHROMATIC
ABERRATION

— d Line
······ g Line
---- C Line

W=13.1

-0.05   0.05

LATERAL
CHROMATIC
ABERRATION

W=13.1

-1   1

ASTIGMATISM

— S
-- M

W=13.1

-3 (%) 3

DISTORTION

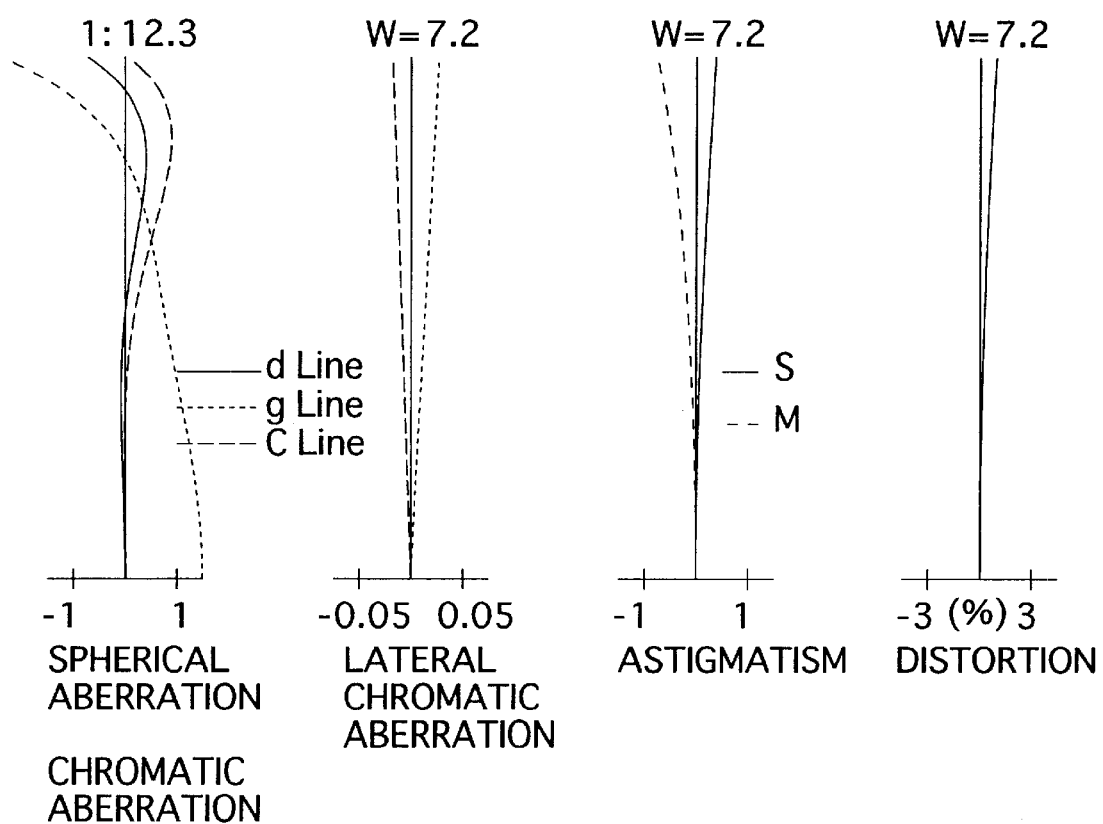

1:5.0

— d Line
······ g Line
--- C Line

-1   1
SPHERICAL
ABERRATION

CHROMATIC
ABERRATION

W=28.2

-0.05  0.05
LATERAL
CHROMATIC
ABERRATION

W=28.2

— S
-- M

-1   1
ASTIGMATISM

W=28.2

-3 (%) 3
DISTORTION

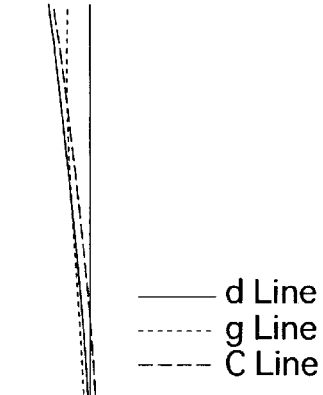
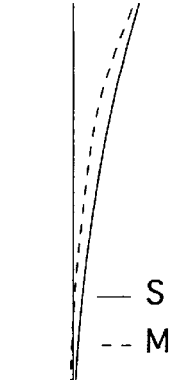
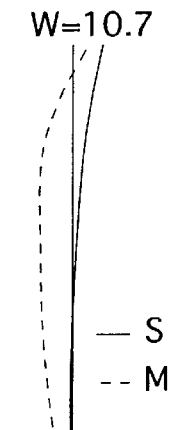

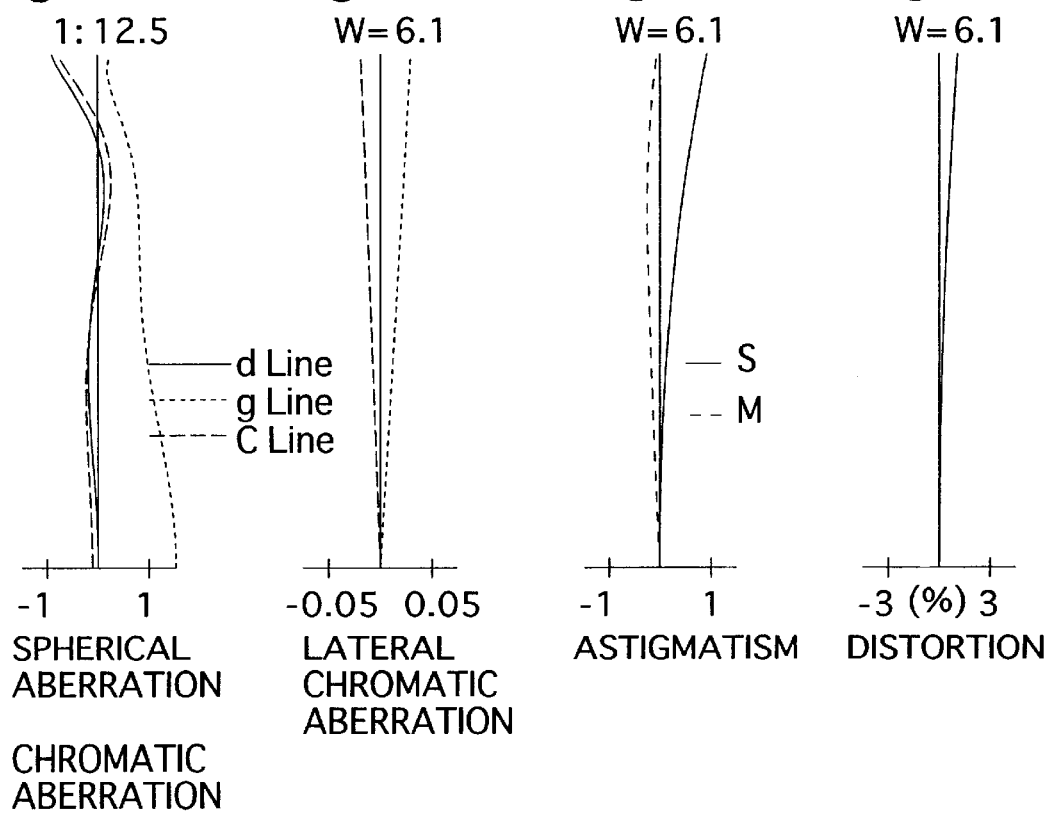

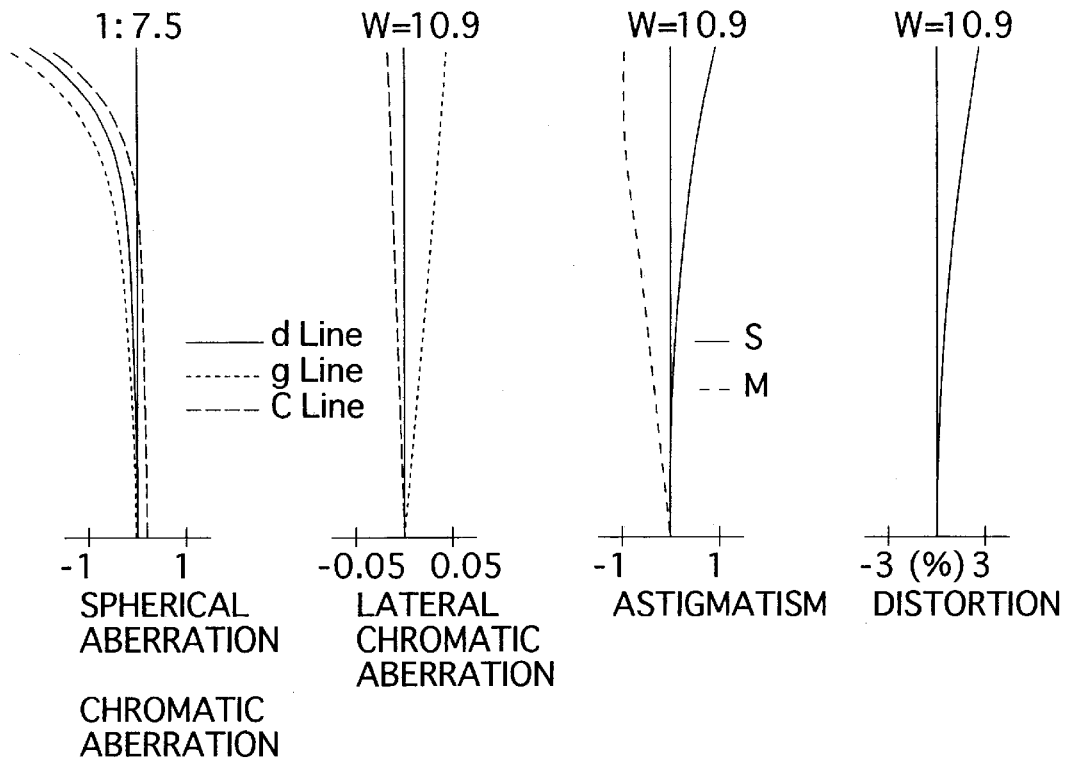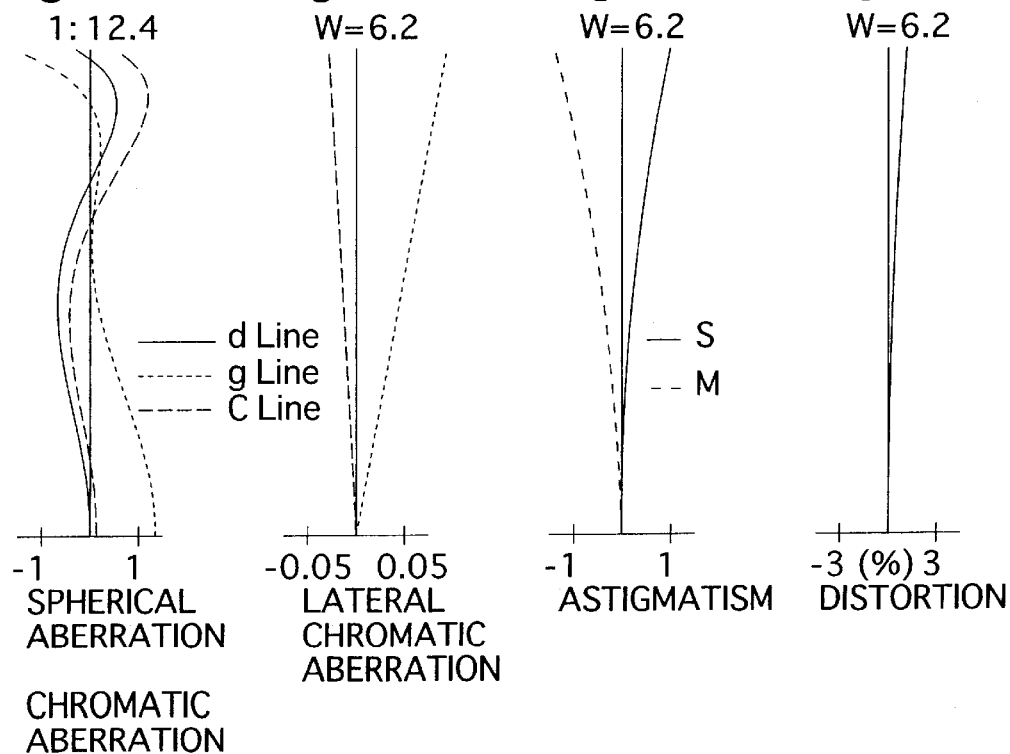

Fig. 25
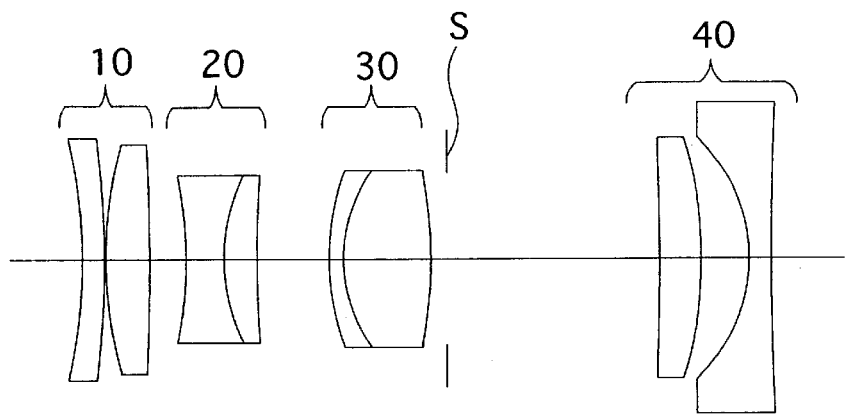
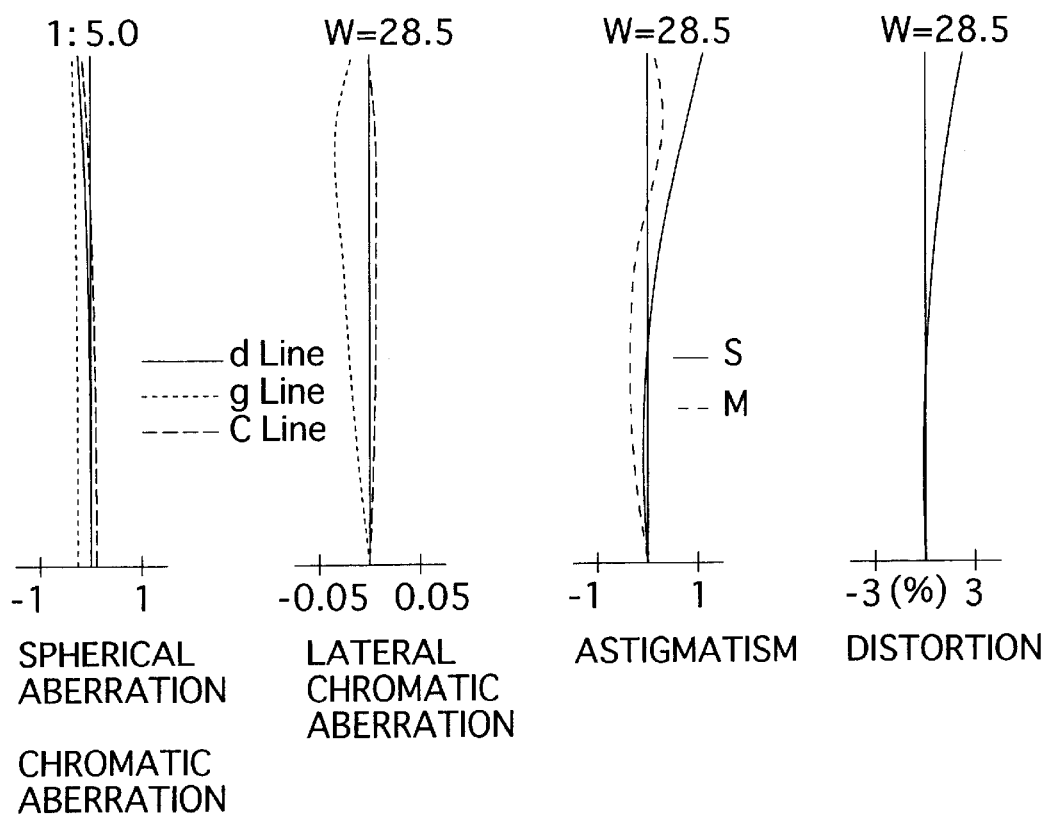
Fig. 26A  Fig. 26B  Fig. 26C  Fig. 26D

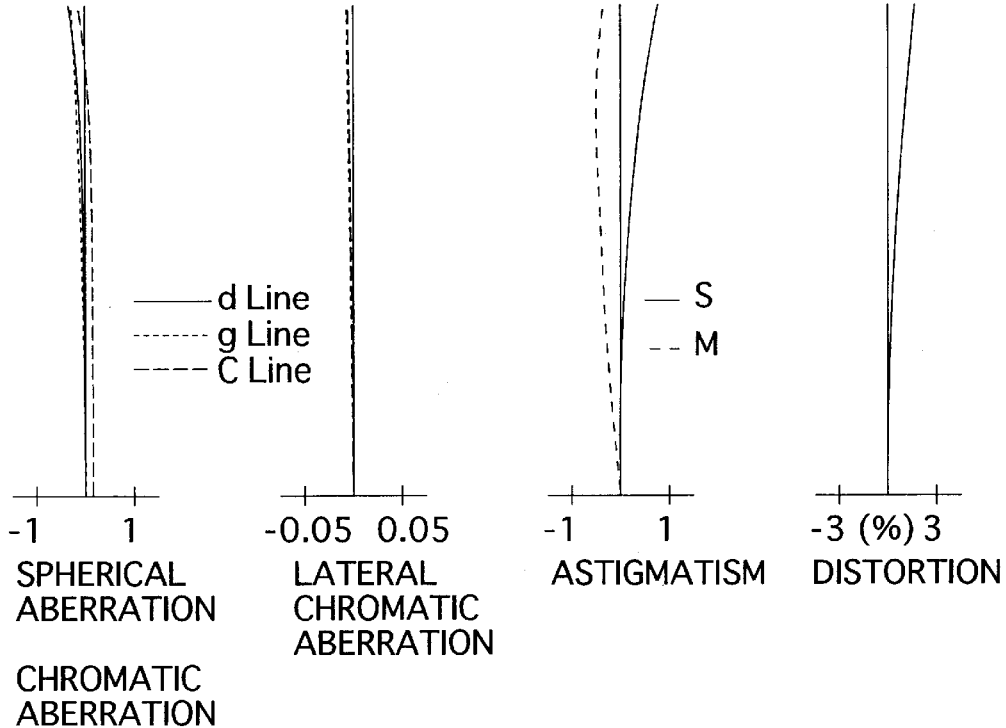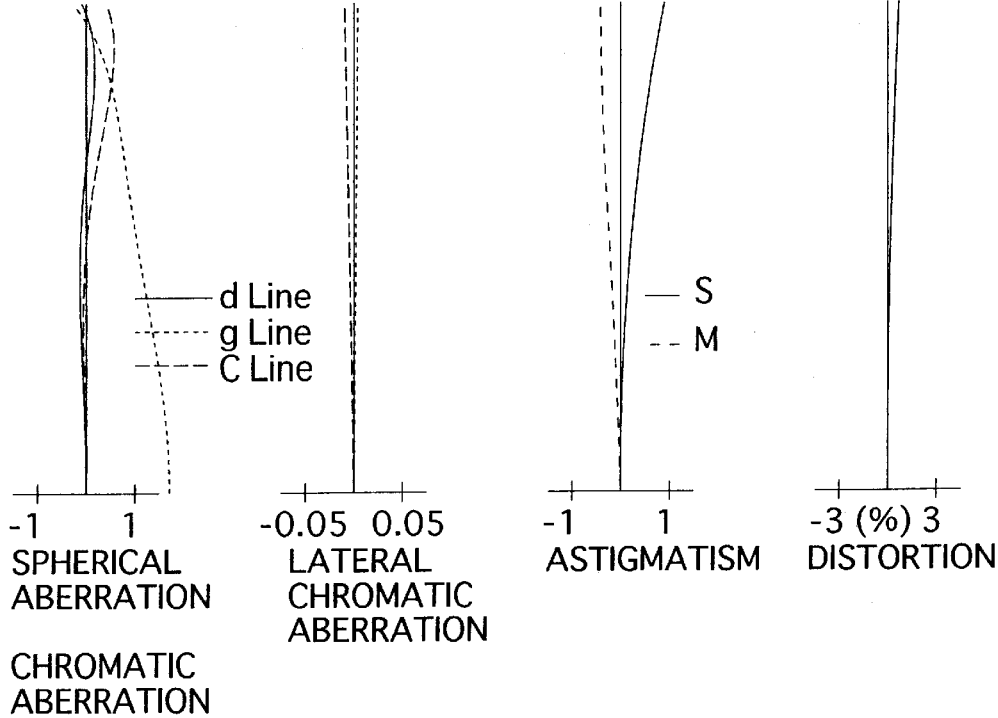

ZOOM LENS SYSTEM

BACKGROUND OF THE INVENTION

1. Field of the Invention

The present invention relates to a zoom lens system for camera, and in particular, to a zoom lens system for a lens-shutter-type compact camera.

2. Description of the Prior Art

Unlike a zoom lens system for a single lens reflex (SLR) camera which requires a space for a quick-return mirror behind the photographing lens system, a zoom lens system for a compact camera does not require a long back focal distance.

As a zoom lens system of this type having no specific requirement on the back focal distance, the three-lens-group arrangement, i.e., a positive lens group, a positive lens group and a negative lens group in this order from the object, have been proposed. More specifically, a zoom lens system of the three-lens-group arrangement has been disclosed in, e.g., U.S. Pat. No. 4,978,204. However, in the above zoom lens system, if the zoom ratio thereof is increased, the overall length thereof at the long focal length extremity becomes longer.

Furthermore, in order to miniaturize the zoom lens system, and to obtain a higher zoom ratio, a zoom lens system of the four-lens-group arrangement, i.e., a positive lens group, a negative lens group, a positive lens group and a negative lens group in this order from the object, has been proposed, as disclosed in, e.g., JUPP6-265788 and JUPP2000-180725. Even by such a four-lens-group arrangement, the overall length of the zoom lens system at the long focal length extremity becomes longer due to the long traveling distances of the lens groups for zooming; and miniaturization of the zoom lens system cannot be attained, since the entrance pupil is distant from the front (most object-side) lens group at the short focal length extremity, so that the diameter thereof becomes larger.

Still further, if an attempt is made to obtain both a higher zoom ratio and the shorter overall length of the zoom lens system at the long focal length extremity, the focusing sensitivity thereat increases, so that the focal point moves largely even with respect to a slight positional error caused by the movement of each lens group. Consequently, the image-forming performance deteriorates.

Particularly, in the case where a higher zoom ratio is attained by a zoom lens system of the four-lens-group arrangement, i.e., a positive lens group, a negative lens group, a positive lens group and a negative lens group in this order from the object, such a four-lens-group arrangement is advantageous to shorten the overall length of the zoom lens system at the long focal length extremity, in comparison with a zoom lens system of the three-lens-group arrangement; however, in the prior art, the focusing sensitivity of internal lens groups (the second and the third lens groups) cannot be reduced.

SUMMARY OF THE INVENTION

The present invention is to provide a miniaturized zoom lens system with a higher zoom ratio, which can achieve suitable optical performance over the entire focal length ranges, in spite of a small number of lens elements in the zoom lens system. These features can be attained by making the overall length of the zoom lens system at the long focal length extremity shorter, and by making the diameter of the front (most object-side) lens group smaller.

Furthermore, the present invention is to provide a miniaturized zoom lens system of the four-lens-group arrangement, i.e., a positive lens group, a negative lens group, a positive lens group and a negative lens group in this order from the object, which is advantageously small for manufacturing and has a higher zoom ratio, while the focusing sensitivity which tends to become larger in the internal lens groups (the second and the third lens groups) can be reduced.

Still further, the present invention is to provide a zoom lens system which (i) is suitable for a retractable lens-shutter-type compact camera, and (ii) has the smaller diameter of the front (most object-side) lens group.

More specifically, a zoom ratio of the zoom lens system can be set to $Z(=f_T/f_W)>3$, and the overall length $TL_T$ thereof can be made shorter to the extent that $TL_T/f_T<1.0$; wherein $TL_T$ designates the distance, at the long focal length extremity, between the most object-side surface of the zoom lens system and the image plane;

$f_T$ designates the focal length of the entire zoom lens system at the long focal length extremity; and $f_W$ designates the focal length of the entire zoom lens system at the short focal length extremity.

In addition to the above, a zoom ratio of the zoom lens system according to the present invention can be made higher, such as $Z(=f_T/f_W)>4$, under the same condition of $TL_T/f_T<1.0$.

According to a first aspect of the present invention, there is provided a zoom lens system including a positive first lens group (hereinafter, the first lens group), a negative second lens group (hereinafter, the second lens group), a positive third lens group (hereinafter, the third lens group), and a negative fourth lens group (hereinafter, the fourth lens group), in this order from the object. zooming is performed by moving each of the first through fourth lens groups in the optical axis direction, and the zoom lens system satisfies the following conditions:

$$1.1 < f_{23T}/f_{23W} < 1.8 \tag{1}$$

$$0.2 < LD_{23W}/f_W < 0.45 \tag{2}$$

$$0.01 < (D_{23W} - D_{23T})/f_T < 0.05 \tag{3}$$

wherein $f_{23W}$ designates the combined focal length of the second and third lens groups at the short focal length extremity;

$f_{23T}$ designates the combined focal length of the second and third lens groups at the long focal length extremity;

$LD_{23W}$ designates the distance between the most object-side surface of the second lens group and the most image-side surface of the third lens group at the short focal length extremity;

$f_W$ designates the focal length of the entire zoom lens system at the short focal length extremity;

$D_{23W}$ designates the axial air-distance between the second lens group and the third lens group at the short focal length extremity; and $D_{23T}$ designates the axial air-distance between the second lens group and the third lens group at the long focal length extremity.

The zoom lens system according to the first aspect of the present invention further satisfies the following conditions:

$$0.1 < |r1/f_T| < 0.25 \, (r1 < 0) \tag{4}$$

$$6.0 < |f_T/f_2| < 12.0 \, (f_2 < 0) \tag{5}$$

wherein r1 designates the radius of curvature of the most object-side surface of the first lens group; and $f_2$ designates the focal length of the second lens group.

In the zoom lens system according to the first aspect of the present invention, the traveling distances of the first and fourth lens groups are the same upon zooming. In other words, these lens groups are integrally moved. According to this arrangement, the structure of the lens barrels can be simplified, and the size of the zoom lens system in the radial direction can be made smaller. As a result, a lens-shutter-type compact camera having a retractable zoom lens system can be miniaturized, and further, the structure of the lens barrels can also be simplified.

Focusing can be performed by integrally moving the second lens group and the third lens group in the optical axis direction. In this regard, for miniaturizing a camera, it is preferable that a lens group to perform focusing (hereinafter, focusing lens group) be small and light (not heavy), and that the traveling distance thereof be shorter. The second lens group or the third lens group, in which the optical-effective diameter is relatively smaller than other lens groups, can be a focusing lens group. However, if an attempt is made to perform focusing by the second or third lens group only, the traveling distance thereof becomes longer, so that miniaturization of the zoom lens system is difficult. On the other hand, by performing focusing with the integrally-moved second and third lens groups, miniaturization of the zoom lens system can be attained, and optical deterioration can be prevented when photography is carried out for an object at a closer distance.

In the first aspect of the present invention, the second lens group requires strong refractive power in order to attain a higher zoom ratio with a shorter traveling distance. In such a case, if a negative lens element of the second lens group is formed by a lens material of low refractive index, coma and astigmatism largely occur; and furthermore, a negative value of the Petzval sum becomes larger, so that field curvature largely occurs in the positive direction. Consequently, off-axis aberrations deteriorate. On the other hand, for the purpose of avoiding the deterioration of off-axis aberrations, it is preferable that the average refractive power $N_{2G}$ of the d line with respect to the negative lens element of the second lens group be greater than 1.82. If $N_{2G}$ exceeds the lower limit of this condition, the negative value of the Petzval sum becomes larger, and off-axis optical performance deteriorates.

According to a second aspect of the present invention, there is provided a zoom lens system including a first lens group, a second lens group, a third lens group, and a fourth lens group, in this order from the object. zooming is performed by moving each of the first through fourth lens groups in the optical axis direction, and the zoom lens system satisfies the following condition:

$$0.4 < \{(f_T/f_{12T})^2 - (f_T/f_1)^2\}/\{(f_T/f_{123T})^2 - (f_T/f_{12T})^2\} < 1.6 \quad (6)$$

wherein $f_T$ designates the focal length of the entire zoom lens system at the long focal length extremity;

$f_1$ designates the focal length of the first lens group;

$f_{12T}$ designates the combined focal length of the first lens group and the second lens group at the long focal length extremity; and $f_{123T}$ designates the combined focal length of the first lens group, the second lens group and the third lens group at the long focal length extremity.

The zoom lens system according to the second aspect of the present invention further satisfies the following condition:

$$3.0 < [\{(f_T/f_{12T})^2 - (f_T/f_1)^2\} + \{(f_T/f_{123T})^2(f_T/f_{12T})^2\}]/Z < 4.0 \quad (7)$$

wherein $Z = f_T/f_W$; and $f_W$ designates the focal length of the entire zoom lens system at the short focal length extremity.

Note that $\{(f_T/f_{12T})^2 - (f_T/f_1)^2\}$ in conditions (6) and (7) is defined as the focusing sensitivity ($K_2$) of the second lens group, and $(f_T/f_{123T})^2 - (f_T/f_{12T})^2\}$ is defined as the focusing sensitivity ($K_3$) of the third lens group.

Similar to the first aspect of the present invention, the traveling distances of the first and fourth lens groups are the same upon zooming, and these lens groups are integrally moved. According to the second aspect of the present invention, the same advantages as those of the first aspect can be obtained; and at the same time, the focusing sensitivity can be reduced.

In the case where the first and fourth lens groups are integrally moved upon zooming, the zoom lens system preferably satisfies the following condition:

$$2.5 < |(f_T/f_1)^2 + 1 - (f_T/f_{123T})^2|Z < 4.0 \quad (8)$$

Note that $(f_T/f_1)^2 + 1 - (f_T/f_{123T})^2$ is equivalent to $|K_1 + K_4|/Z$.

Similar to the first aspect of the present invention, focusing is preferably performed by integrally moving the second lens group and the third lens group in the optical axis direction. By integrally moving these lens groups, the same effects as those of the first aspect of the present invention can be obtained.

The present disclosure relates to subject matters contained in Japanese Patent Application Nos. 2001-137324 (filed on May 8, 2001) and 2001-160044 (filed on May 29, 2001) which are expressly incorporated herein in their entireties.

BRIEF DESCRIPTION OF THE DRAWINGS

The present invention will be discussed below in detail with reference to the accompanying drawings, in which:

FIG. 1 is a lens arrangement of a zoom lens system according to a first embodiment of the present invention;

FIGS. 2A, 2B, 2C and 2D show aberrations occurred in the lens arrangement shown in FIG. 1 at the short focal length extremity;

FIGS. 3A, 3B, 3C and 3D show aberrations occurred in the lens arrangement shown in FIG. 1 at an intermediate focal length in a short-focal-length zooming range ZW;

FIGS. 4A, 4B, 4C and 4D show aberrations occurred in the lens arrangement shown in FIG. 1 at an after-switching intermediate focal length in a long-focal-length zooming range ZT;

FIG. 6 is a lens arrangement of the zoom lens system according to a second embodiment of the present invention;

FIGS. 7A, 7B, 7C and 7D show aberrations occurred in the lens arrangement shown in FIG. 6 at the short focal length extremity;

FIGS. 8A, 8B, 8C and 8D show aberrations occurred in the lens arrangement shown in FIG. 6 at an intermediate focal length in the short-focal-length zooming range ZW;

FIGS. 9A, 9B, 9C and 9D show aberrations occurred in the lens arrangement shown in FIG. 6 at an after-switching intermediate focal length in the long-focal-length zooming range ZT;

FIG. 11 is a lens arrangement the zoom lens system according to a third embodiment of the present invention;

FIGS. 12A, 12B, 12C and 12D show aberrations occurred in the lens arrangement shown in FIG. 11 at the short focal length extremity;

FIGS. 15A, 15B, 15C and 15D show aberrations of the lens arrangement shown in FIG. 11 at the long focal length extremity;

FIGS. 18A, 18B, 18C and 18D show aberrations occurred in the lens arrangement shown in FIG. 16 at an intermediate focal length in the short-focal-length zooming range ZW;

FIGS. 19A, 19B, 19C and 19D show aberrations occurred in the lens arrangement shown in FIG. 16 at an after-switching intermediate focal length in the long-focal-length zooming range ZT;

FIGS. 20A, 20B, 20C and 20D show aberrations occurred in the lens arrangement shown in FIG. 16 at the long focal length extremity;

FIGS. 23A, 23B, 23C and 23D show aberrations occurred in the lens arrangement shown in FIG. 21 at an intermediate focal length;

FIGS. 24A, 24B, 24C and 24D show aberrations occurred in the lens arrangement shown in FIG. 21 at the long focal length extremity;

FIG. 25 is a lens arrangement of the zoom lens system according to a sixth embodiment of the present invention;

FIGS. 26A, 26B, 26C and 26D show aberrations occurred in the lens arrangement shown in FIG. 25 at the short focal length extremity;

FIGS. 27A, 27B, 27C and 27D show aberrations occurred in the lens arrangement shown in FIG. 25 at an intermediate focal length;

FIGS. 28A, 28B, 28C and 28D show aberrations occurred in the lens arrangement shown in FIG. 25 at the long focal length extremity;

DESCRIPTION OF THE PREFERRED EMBODIMENTS

As shown in the lens-group moving paths of FIGS. 29 and 30, the four-lens-group zoom lens system of a compact camera includes a positive first lens group (hereinafter, the first lens group) 10, a negative second lens group (hereinafter, the second lens group) 20, a positive third lens group (hereinafter, the third lens group) 30, and a negative fourth lens group (hereinafter, the fourth lens group) 40, in this order from the object. Zooming is performed by moving each of the first through fourth lens groups 10 through 40 in the optical axis direction. A diaphragm S is provided between the third lens group 30 and the fourth lens group 40, and is arranged to integrally move with the third lens group 30.

Figure 29:
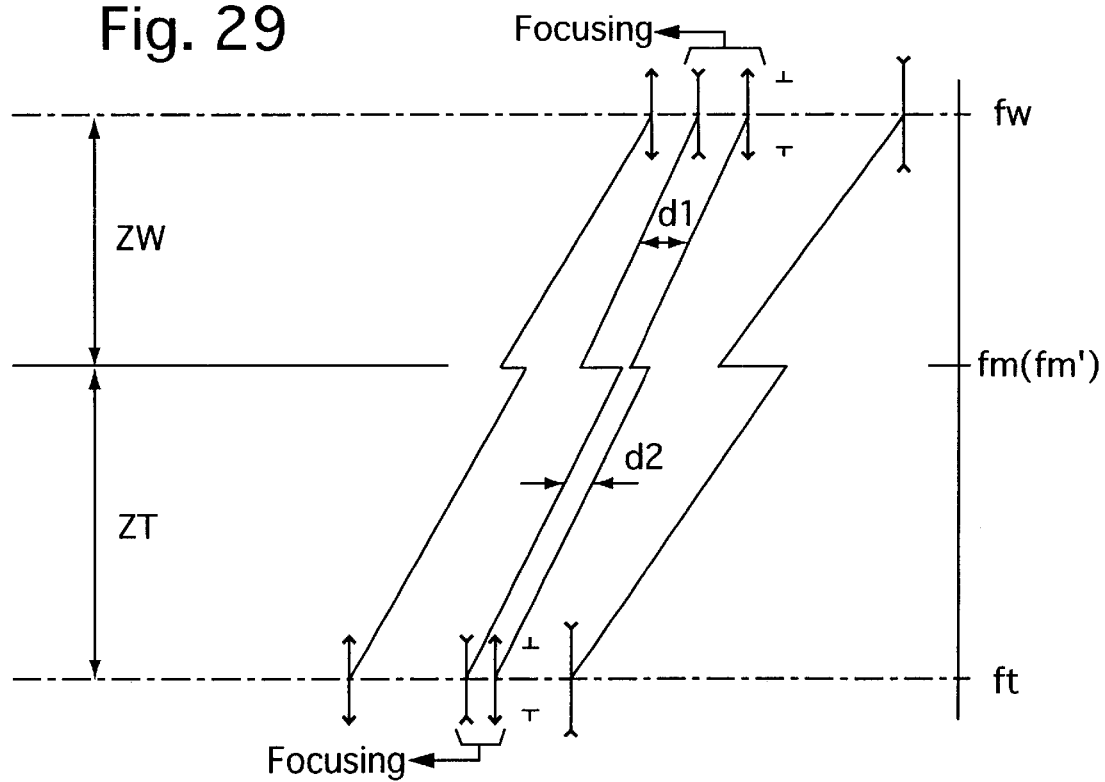
FIG. 29 shows schematic lens-group moving paths of the zoom lens system according to the first through fourth embodiments.

FIG. 29 is an example of lens-group moving paths, along which switching movement of the lens groups is performed at an intermediate focal length fm.

Upon zooming from the short focal length extremity fw to the long focal length extremity ft, the first lens group 10, the second lens group 20, the third lens group 30 and the fourth lens group 40 are arranged to move as follows:

(i) In a focal-length range (the first focal-length range; the short-focal-length zooming range) ZW defined by the short focal length extremity fw and the intermediate focal length fm, the first through fourth lens groups move toward the object; and the second lens group 20 and the third lens group 30 maintain a first distance d1 therebetween (the first state);

(ii) At the intermediate focal length fm, the first through fourth lens groups move toward the image by predetermined distances to set an after-switching intermediate focal length fm'; and the first distance d1 between the second lens group 20 and the third lens group 30 is made shorter to form a second distance d2 (the second state);

(iii) In another focal-length range (the second focal length range; the long-focal-length zooming range) ZT defined by the after-switching intermediate focal length fm' and the long focal length extremity ft, the first through fourth lens groups move toward the object.

Here, it should be noted the intermediate focal length fm belongs to the first focal-length range ZW; and the after-switching intermediate focal length fm' is defined as a focal length which is obtained under the condition that, at the intermediate focal length fm, (i) the first lens group 10 and the fourth lens group 40 move toward the image, and (ii) the first distance d1 between the second lens group 20 and the third lens group 30 is made shorter to form the second distance d2.

The diaphragm S is provided between the third lens group 30 and the fourth lens group 40, and moves together with the third lens group 30 upon zooming.

The lens-group moving paths for the first lens group 10, the second lens group 20, the third lens group 30 and the fourth lens group 40 are schematically depicted as straight lines in FIG. 29. However, actual lens-group moving paths are not always straight lines.

Focusing is performed by integrally moving the second lens group 20 and the third lens group 30, regardless of the focal length ranges.

The lens-group moving paths shown in FIG. 29 are discontinued at the intermediate focal length fm and the after-switching intermediate focal length fm'; however, by adequately determining the positions of the first lens group 10, the second lens group 20, the third lens group 30 and the fourth lens group 40 respectively at the short focal length extremity fw, the intermediate focal length fm, and the after-switching intermediate focal length fm', and the long focal length extremity ft, solutions by which an image is correctly formed exist. According to the lens-group moving paths with such solutions, a zoom lens system which is miniaturized and has a higher zoom ratio can be obtained.

Furthermore, the stopping positions for each of the first through fourth lens groups can be determined in a stepwise manner along the lens-group moving paths of FIG. 29; and in the actual mechanical arrangement, each lens group can be stopped in this manner.

For example, instead of stopping the lens groups at the intermediate focal lengths fm and the after-switching intermediate focal length fm', by appropriately selecting stopping positions before and after these focal lengths fm and fm', the lens-group moving paths can smoothly pass through the discontinued points at the intermediate focal lengths fm and the after-switching intermediate focal length fm'.

Still further, if the following is considered, precision on the movement of the first through fourth lens groups can be increased, since a 'U-turns' movement of the lens groups can be prevented:

(i) In the first focal length range ZW, a stopping position 'A' closest to the intermediate focal length fm is set;
(ii) In the second focal length range ZT, a stopping position 'B' closest to the after-switching intermediate focal length fm' is set; and
(iii) If the stopping position 'B' is set closer to the object than the stopping position 'A' is, so that a 'U-turn' movement of the lens groups can be prevented.

Figure 30:
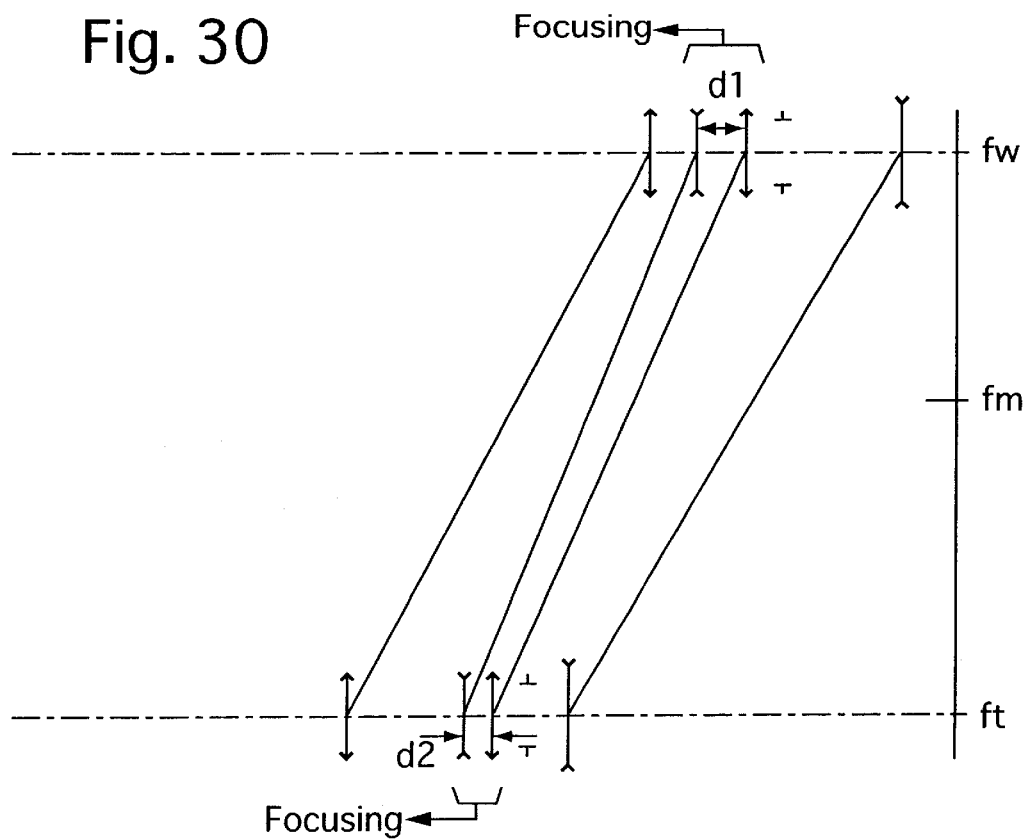
FIG. 30 shows schematic lens-group moving paths of the zoom lens system according to the fifth and sixth embodiments of the a zoom lens system according to the present invention.

FIG. 30 is a schematic lens-group moving paths without after-switching intermediate focal length. Upon zooming from the short focal length extremity fw to the long focal length extremity ft, all the lens groups 10 to 40 move toward the object while the distances thereamong are varied. The diaphragm S is provided between the third lens group 30 and the fourth lens group 40, and moves together with the third lens group 30. Similar to FIG. 29, in FIG. 30, the lens-group moving paths for the first lens group 10, the second lens group 20, the third lens group 30 and the fourth lens group 40 are schematically depicted as straight lines. However, actual lens-group moving paths are not always straight lines.

Condition (1) specifies the ratio of the combined focal length of the second lens group 20 and the third lens group 30 at the short focal length extremity to the combined focal length thereof at the long focal length extremity.

If $f_{23T}/f_{23W}$ exceeds the lower limit of condition (1), the effect of varying the distance between the second and third lens groups 20 and 30 upon zooming is reduced, so that aberration fluctuations upon zooming cannot sufficiently be corrected. As a result, it becomes difficult to attain a higher zoom ratio.

If $f_{23T}/f_{23W}$ exceeds the upper limit of condition (1), the difference in the traveling distances of the second lens group 20 and the third lens group 30 becomes larger, so that miniaturization of the zoom lens system becomes difficult.

Condition (2) specifies the distance between the most object-side surface of the second lens group 20 and the most image-side surface of the third lens group 30 at the short focal length extremity fw.

If $LD_{23W}/fw$ exceeds the lower limit of condition (2), the distance between the second lens group 20 and the third lens group 30 becomes shorter, so that the back focal distance at the short focal length extremity fw becomes extremely short. As a result, the diameter of the fourth lens group 40 becomes larger.

If $LD_{23W}/fw$ exceeds the upper limit of condition (2), the distance between the second lens group 20 and the third lens group 30 becomes too long, so that at the short focal length extremity fw, the entrance pupil moves toward the image plane. As a result, the diameter of the first lens group 10 becomes larger, and miniaturization of the zoom lens system in the radial direction becomes difficult.

Condition (3) specifies the amount of change in the distance between the second lens group 20 and the third lens group 30 upon zooming.

If $(D_{23W}-D_{23T})/f_T$ exceeds the lower limit of condition (3), the zooming-effect of the second lens group 20 and the third lens group 30 is reduced. Accordingly, if an attempt is made to obtain a hi her zoom ratio, the overall length of the zoom lens system has to be made longer.

If $(D_{23W}-D_{23T})/f_T$ exceeds the upper limit of condition (3), the distance between the second lens group 20 and the third lens group 30 becomes longer; and accordingly, the distance from the first lens group 10 to the third lens group 30 increases. Consequently, the diameters of the first lens group 10 and that of the second lens group 20 become larger.

Condition (4) specifies the radius of curvature of the most object-side surface (first surface) of the first lens group 10.

If the power of the first surface becomes stronger to the extent that $|r1/f_T|$ exceeds the lower limit of condition (4), the correcting of off-axis aberrations becomes difficult.

If the power of the first surface becomes weaker to the extent that $|r1/f_T|$ exceeds the upper limit of condition (4), the effective diameter of a bundle of light rays incident on the first surface becomes larger. As a result, miniaturization of the zoom lens system cannot be achieved.

Condition (5) specifies the power of the second lens group 20 with respect to the focal length of the entire zoom lens system at the long focal length extremity ft.

If the power of the second lens group 20 becomes weaker to the extent that $|f_T/f_2|$ exceeds the lower limit of condition (5), the traveling distance of the second lens group 20 in order to attain a higher zoom ratio becomes too long, so that it is difficult to achieve both a higher zoom ratio and miniaturization of the zoom lens system.

If the power of the second lens group 20 becomes stronger to the extent that $|f_T/f_2|$ exceeds the upper limit of condition (5), miniaturization of the zoom lens system can be achieved; however, the correcting of aberrations over the all the zooming ranges becomes difficult; and, in particular, the correcting of off-axis aberrations becomes difficult.

Condition (6) specifies the ratio of the focusing sensitivity of the second lens group 20 to that of the third lens group 30, and is for achieving both a higher zoom ratio and a reduction of the focusing sensitivity.

In the embodiments, the second lens group 20, which has conventionally had only a small zooming effects and a low focusing sensitivity, is arranged to share the zooming effects of the third lens group 30, so that the second lens group 20 can have the focusing sensitivity which is substantially the same level (amount) and sign (direction) as that of the second lens group 30. Consequently, the focusing sensitivity of the third lens group 30 is reduced.

If $\{(f_T/f_{12T})^2-(f_T/f_1)^2\}/\{(f_T/f_{123T})^2-(f_T/f_{12T})^2\}$ exceeds the lower limit of condition (6), the proportion of zooming effects to be shared by the second lens group 20 and the third lens group 30 becomes smaller, so that the focusing sensitivity of the third lens group 30 increases.

If $\{(f_T/f_{12T})^2-(f_T/f_1)^2\}/\{(f_T/f_{123T})^2-(f_T/f_{12T})^2\}$ exceeds the upper limit of condition (6), the zooming effects of the second lens group 20 becomes larger, so that it is difficult to reduce fluctuations of aberrations upon zooming.

Condition (7) specifies the sum of the focusing sensitivity of the second lens group 20 and the third lens group 30 at the long focal length extremity, with respect to the zoom ratio.

If $[\{(f_T/f_{12T})^2-(f_T/f_1)^2\}+\{(f_T/f_{123T})^2-(f_T/f_{12T})^2\}]/Z$ exceeds the lower limit of condition (7), the focusing sensitivity can be reduced; however, the traveling distances of the second and third lens groups become longer. As a result, the overall length of the zoom lens system becomes longer at the long focal length extremity.

If $[\{(f_T/f_{12T})^2-(f_T/f_1)^2\}+\{(f_T/f_{123T})^2-(f_T/f_{12T})^2\}]/Z$ exceeds the upper limit of condition (7), the focusing sensitivity becomes undesirably too high, particularly, in the zoom lens system of the embodiments with a higher zoom ratio.

Condition (8) specifies the focusing sensitivity under the condition that the first lens group 10 and fourth lens group 40 are integrally moved.

By integrally moving the first and fourth lens groups, which have focusing sensitivity of the opposite signs (directions), the focusing sensitivity thereof can be reduced.

If $|(f_T/f_1)^2+1-(f_T/f_{123T})^2|/Z$ exceeds the lower limit of condition (8), the power of the fist lens group 10 becomes larger in order to increase the effects of reduction on the focusing sensitivity. Consequently, the correcting of aberrations becomes difficult.

If $|(f_T/f_1)^2+1-(f_T/f_{123T})^2|/Z$ exceeds the upper limit of condition (8), the effects of reduction on the focusing sensitivity becomes smaller.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, $F_{NO}$ designates the f-number, f designates the focal length of the entire zoom lens system, $f_B$ designates the back focal distance, w designates the half angle-of-view (°), r designates the radius of curvature, d designates the lens-element thickness or distance between lens elements, Nd designates the refractive index of the d-line, and v designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

[Embodiment 1]

FIGS. 1 through 5D show the first embodiment of the zoom lens system. More specifically, the first embodiment is applied to a zoom lens system having the lens-group moving paths shown in FIG. 29. FIG. 1 is the lens arrangement of the zoom lens system according to the first embodiment. FIGS. 2A to 2D show aberrations occurred in the lens arrangement shown in FIG. 1 at the short focal length extremity fw. FIGS. 3A to 3D show aberrations occurred in the lens arrangement shown in FIG. 1 at an intermediate focal length fm in a short-focal-length zooming range ZW. FIGS. 4A to 4D show aberrations occurred in the lens arrangement shown in FIG. 1 at an after-switching intermediate focal length fm' in a long-focal-length zooming range ZT. FIGS. 5A to 5D show aberrations occurred in the lens arrangement shown in FIG. 1 at the long focal length extremity ft. Table 1 shows the numerical values of the first embodiment. The values of f, W and fB therein are shown in the order fw, fm, fm', and ft.

The second lens group 20 and the third lens group 30 maintain the first distance d1 (4.00 mm) in the short-focal-length zooming range ZW, and maintain the second distance d2 (0.50 mm) in the long-focal-length zooming range ZT.

Surface Nos. 1 through 4 designate the first lens group 10, surface Nos. 5 through 7 designate the second lens group 20, surface Nos. 8 through 10 designate the third lens group 30, and surface Nos. 11 through 14 designate the fourth lens group 40. The diaphragm S is provided 1.0 mm behind, i.e., toward the image plane from, the third lens group 30 (surface No. 10). The first lens group 10 includes a negative lens element and a positive lens element, in this order from the object. The second lens group 20 includes cemented lens elements having a biconcave negative lens element and a positive lens element, in this order from the object. The third lens group 30 includes cemented lens elements having a negative meniscus lens with the convex surface facing toward the object, and a positive lens element, in this order from the object. The fourth lens group 40 includes a positive lens element and a negative lens element, in this order from the object.

TABLE 1

$F_{NO} = 1:5.8 - 11.4 - 9.4 - 14.1$
$f = 39.28 - 90.00 - 90.00 - 200.00$
$W = 28.0 - 13.5 - 13.0 - 6.1$
$f_B = 9.37 - 39.83 - 31.45 - 86.95$

| Surf. No. | r | d | $N_d$ | v |
|---|---|---|---|---|
| 1 | −24.990 | 1.50 | 1.84666 | 23.8 |
| 2 | −40.187 | 0.10 | — | — |
| 3 | 29.998 | 3.00 | 1.48749 | 70.2 |
| 4 | −55.568 | 2.50 − 11.63 − 11.72 − 17.59 | — | — |
| 5 | −31.413 | 1.00 | 1.88300 | 40.8 |
| 6 | 11.786 | 2.78 | 1.84666 | 23.8 |
| 7 | 74.437 | 4.00 − 4.00 − 0.50 − 0.50 | — | — |
| 8 | 13.198 | 1.20 | 1.84666 | 23.8 |
| 9 | 8.777 | 5.59 | 1.58636 | 60.9 |
| 10* | −25.902 | 13.88 − 4.75 − 8.16 − 2.30 | — | — |
| 11* | 33.087 | 2.90 | 1.58547 | 29.9 |
| 12* | 286.686 | 5.29 | — | — |
| 13 | −9.899 | 1.50 | 1.72916 | 54.7 |
| 14 | −1005.374 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | $0.65922 \times 10^{-4}$ | $-0.20286 \times 10^{-6}$ | — |
| 11 | 0.00 | $0.20270 \times 10^{-4}$ | $-0.19872 \times 10^{-6}$ | $0.97064 \times 10^{-8}$ |
| 12 | 0.00 | $-0.79376 \times 10^{-4}$ | $0.12147 \times 10^{-6}$ | |

[Embodiment 2]

FIGS. 6 through 10D show the second embodiment of the zoom lens system. Similar to the first embodiment, the second embodiment is applied to a zoom lens system having the lens-group moving paths shown in FIG. 29. FIG. 6 is the lens arrangement of the zoom lens system according to the second embodiment. FIGS. 7A to 7D show aberrations occurred in the lens arrangement shown in FIG. 6 at the short focal length extremity fw. FIGS. 8A to 8D show aberrations occurred in the lens arrangement shown in FIG. 6 at an intermediate focal length fm in the short-focal-length zooming range ZW. FIGS. 9A to 9D show aberrations occurred in the lens arrangement shown in FIG. 6 at an after-switching intermediate focal length fm' in the long-focal-length zooming range ZT. FIGS. 10A to 10D show aberrations occurred in the lens arrangement shown in FIG. 6 at the long focal length extremity ft. Table 2 shows the numerical values of the second embodiment. The values of f, W and $f_B$ therein are shown in the order fw, fm, fm', and ft.

The second lens group 20 and the third lens group 30 maintain the first distance d1 (4.00 mm) in the short-focal-length zooming range ZW, and maintain the second distance d2 (0.50 mm) in the long-focal-length zooming range ZT. The basic lens arrangement is the same as the first embodiment. The diaphragm S is provided 1.0 mm behind, i.e., toward the image plane from, the third lens group 30 (surface No. 10).

TABLE 2

$F_{NO}$ = 1:5.8 – 11.4 – 11.7 – 13.8
f = 39.28 – 90.00 – 90.00 – 195.00
W = 28.1 – 13.4 – 13.0 – 6.3
$f_B$ = 9.44 – 39.92 – 31.53 – 84.52

| Surf. No. | r | d | $N_d$ | ν |
|---|---|---|---|---|
| 1 | −24.738 | 1.50 | 1.84666 | 23.8 |
| 2 | −41.865 | 0.10 | — | — |
| 3 | 42.018 | 3.00 | 1.61800 | 63.4 |
| 4 | −51.984 | 2.50 – 11.56 – 11.71 – 17.46 | — | — |
| 5 | −30.566 | 1.00 | 1.88300 | 40.8 |
| 6 | 11.699 | 2.80 | 1.84666 | 23.8 |
| 7 | 76.261 | 4.00 – 4.00 – 0.50 – 0.50 | — | — |
| 8 | 13.347 | 1.20 | 1.84666 | 23.8 |
| 9 | 8.790 | 5.92 | 1.58636 | 60.9 |
| 10* | −24.896 | 14.31 – 5.25 – 8.60 – 2.85 | — | — |
| 11* | 42.658 | 2.90 | 1.58547 | 29.9 |
| 12* | −218.830 | 5.05 | — | — |
| 13 | −9.753 | 1.50 | 1.72916 | 54.7 |
| 14 | −508.814 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | 0.64024 × 10$^{-4}$ | −0.26444 × 10$^{-6}$ | — |
| 11 | 0.00 | 0.44240 × 10$^{-4}$ | −0.63486 × 10$^{-6}$ | 0.11841 × 10$^{-7}$ |
| 12 | 0.00 | −0.59001 × 10$^{-4}$ | −0.30620 × 10$^{-6}$ | — |

[Embodiment 3]

FIGS. 11 through 15D show the third embodiment of the zoom lens system. Similar to the first embodiment, the third embodiment is applied to a zoom lens system having the lens-group moving paths shown in FIG. 29. FIG. 11 is the lens arrangement of the zoom lens system according to the third embodiment. FIGS. 12A to 12D show aberrations occurred in the lens arrangement shown in FIG. 11 at the short focal length extremity fw. FIGS. 13A to 13D show aberrations occurred in the lens arrangement shown in FIG. 11 at an intermediate focal length fm in the short-focal-length zooming range ZW. FIGS. 14A to 14D show aberrations occurred in the lens arrangement shown in FIG. 11 at an after-switching intermediate focal length fm' in the long-focal-length zooming range ZT. FIGS. 15A to 15D show aberrations occurred in the lens arrangement shown in FIG. 11 at the long focal length extremity ft. Table 3 shows the numerical values of the third embodiment. The values of f, W and $f_B$ therein are shown in the order fw, fm, fm', and ft.

The second lens group 20 and the third lens group 30 maintain the first distance d1 (3.10 mm) in the short-focal-length zooming range ZW, and maintain the second distance d2 (0.50 mm) in the long-focal-length zooming range ZT. The basic lens arrangement is the same as the first embodiment. The diaphragm S is provided 1.0 mm behind, i.e., toward the image plane from, the third lens group 30 (surface No. 10).

TABLE 3

$F_{NO}$ = 1:4.2 – 8.0 – 8.3 – 12.3
f = 39.30 – 90.00 – 90.00 – 170.00
W = 28.2 – 13.4 – 13.1 – 7.2
$f_B$ = 10.33 – 44.23 – 37.00 – 83.54

| Surf. No. | r | d | $N_d$ | ν |
|---|---|---|---|---|
| 1 | −26.785 | 1.50 | 1.84666 | 23.8 |
| 2 | −46.643 | 0.10 | — | — |
| 3 | 52.378 | 2.90 | 1.69680 | 55.5 |
| 4 | −52.378 | 2.49 – 12.31 – 12.46 – 17.64 | — | — |
| 5 | −24.922 | 1.50 | 1.78590 | 44.2 |
| 6 | 14.011 | 3.31 | 1.80518 | 25.4 |
| 7 | 57.831 | 3.10 – 3.10 – 0.50 – 0.50 | — | — |
| 8 | 14.286 | 1.50 | 1.84666 | 23.8 |
| 9 | 10.000 | 4.19 | 1.58636 | 60.9 |
| 10* | −22.418 | 15.06 – 5.24 – 7.69 – 2.51 | — | — |
| 11* | 636.626 | 2.90 | 1.58547 | 29.9 |
| 12 | −36.701 | 3.96 | — | — |
| 13 | −10.417 | 1.50 | 1.72916 | 54.7 |
| 14 | −165.355 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | 0.78571 × 10$^{-4}$ | −0.13367 × 10$^{-6}$ | — |
| 11 | 0.00 | 0.81437 × 10$^{-4}$ | −0.24992 × 10$^{-6}$ | 0.69077 × 10$^{-8}$ |

[Embodiment 4]

Figure 5A:
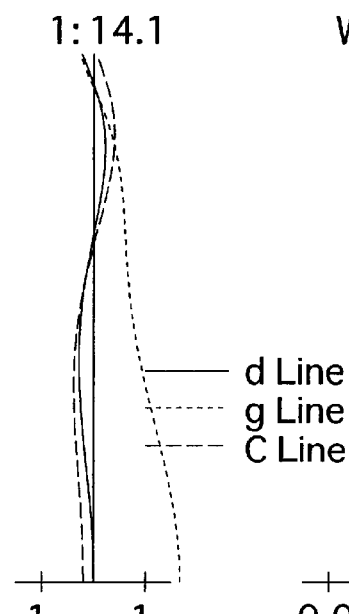
FIGS. 5A, 5B, 5C and 5D show aberrations occurred in the lens arrangement shown in FIG. 1 at the long focal length extremity.
Figure 5B:
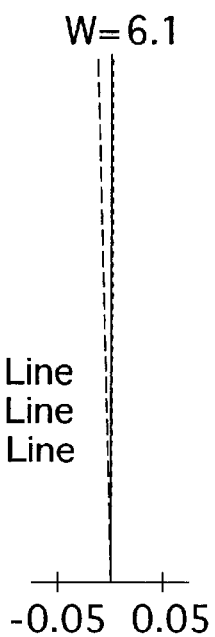
Figure 5C:
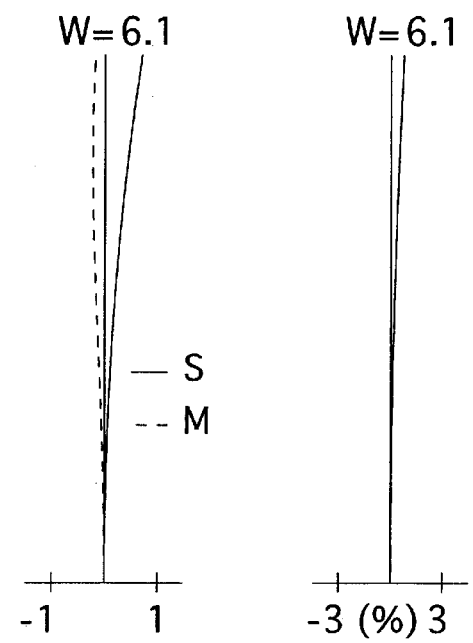
Figure 5D:
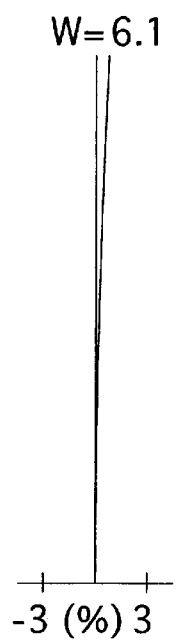
Figure 10A:
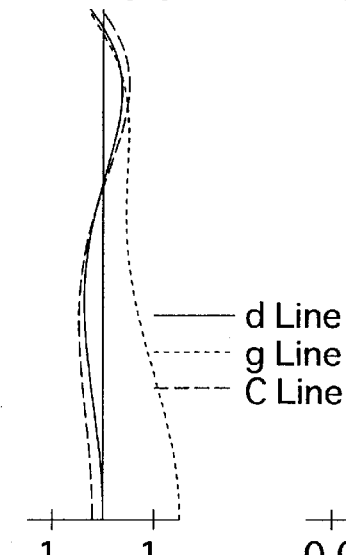
FIGS. 10A, 10B, 10C and 10D show aberrations occurred in the lens arrangement shown in FIG. 6 at the long focal length extremity.
Figure 10B:
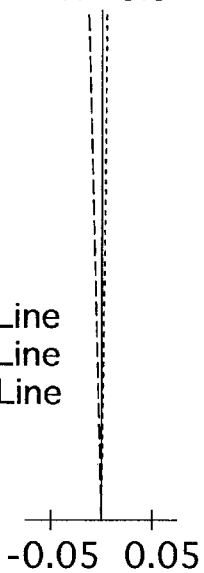
Figure 10C:
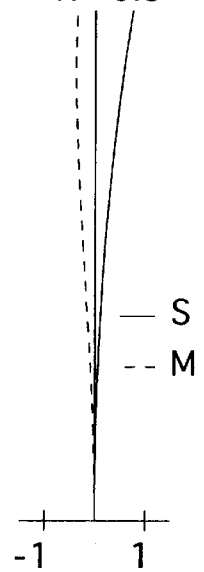
Figure 10D:
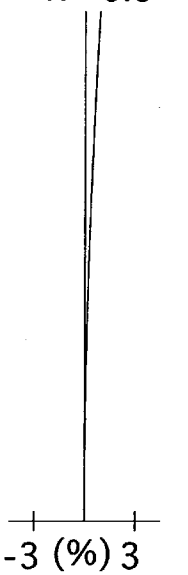
Figure 13A:
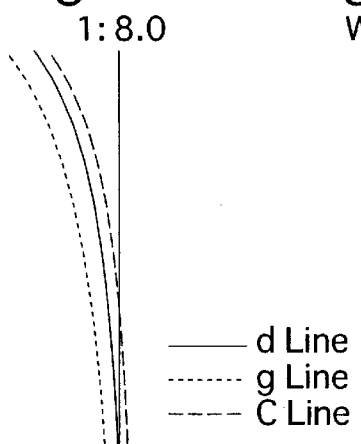
FIGS. 13A, 13B, 13C and 13D show aberrations occurred in the lens arrangement shown in FIG. 11 at an intermediate focal length in the short-focal-length zooming range ZW.
Figure 13B:
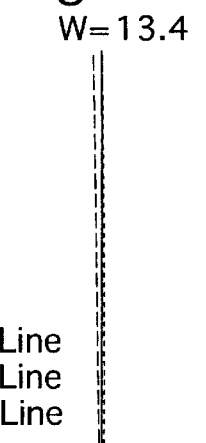
Figure 13C:
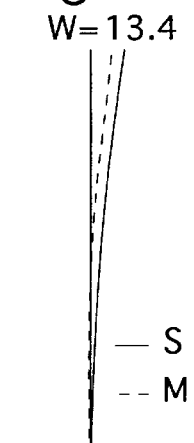
Figure 13D:
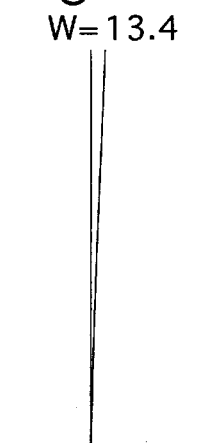
Figure 14A:
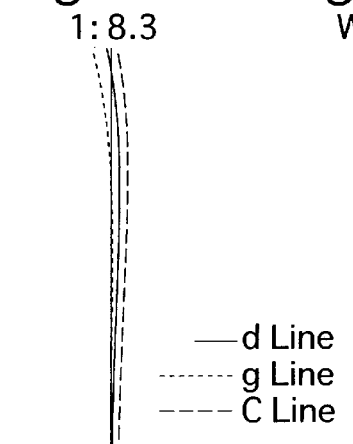
FIGS. 14A, 14B, 14C and 14D show aberrations occurred in the lens arrangement shown in FIG. 11 at an after-switching intermediate focal length in the long-focal-length zooming range ZT.
Figure 14B:
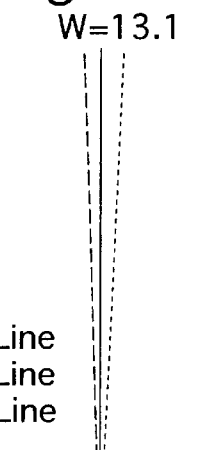
Figure 14C:
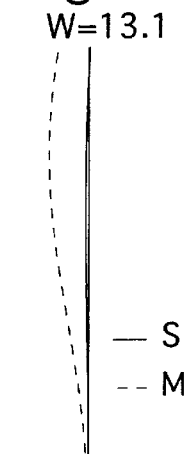
Figure 14D:
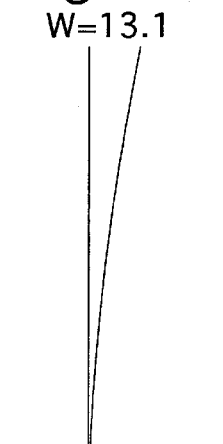
Figure 16:
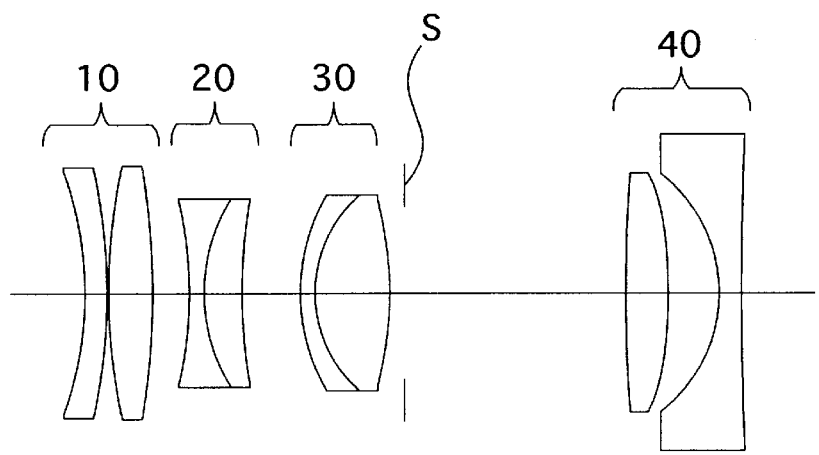
FIG. 16 is a lens arrangement of the zoom lens system according to a fourth embodiment of the present invention.
Figure 17A:
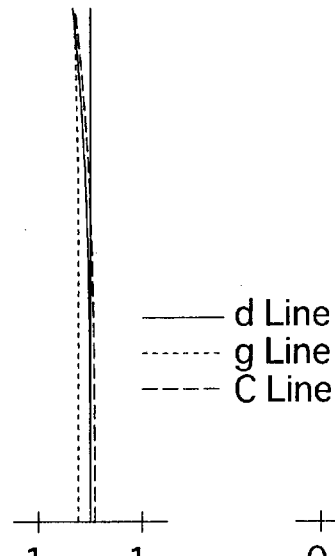
FIGS. 17A, 17B, 17C and 17D show aberrations occurred in the lens arrangement shown in FIG. 16 at the short focal length extremity.
Figure 17B:
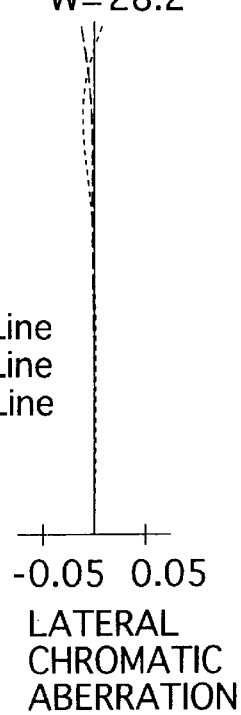
Figure 17C:
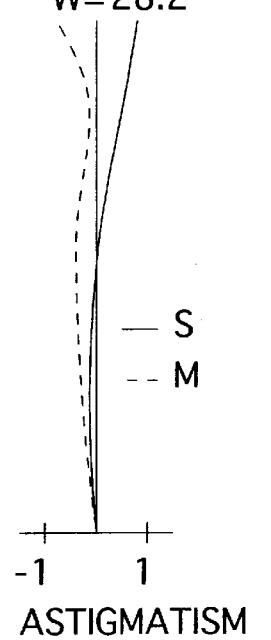
Figure 17D:
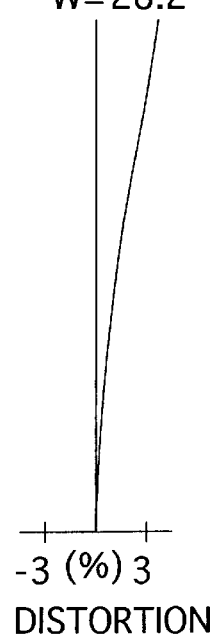

FIGS. 16 through 21D show the fourth embodiment of the zoom lens system. Similar to the first embodiment, the fourth embodiment is applied to a zoom lens system having the lens-group moving paths shown in FIG. 29. FIG. 16 is the lens arrangement of the zoom lens system according to the fourth embodiment. FIGS. 17A to 17D show aberrations occurred in the lens arrangement shown in FIG. 16 at the short focal length extremity fw. FIGS. 18A to 18D show aberrations occurred in the lens arrangement shown in FIG. 16 at an intermediate focal length fm in the short-focal-length zooming range ZW. FIGS. 19A to 19D show aberrations occurred in the lens arrangement shown in FIG. 16 at an after-switching intermediate focal length fm' in the long-focal-length zooming range ZT. FIGS. 20A to 20D show aberrations occurred in the lens arrangement shown in FIG. 16 at the long focal length extremity ft. Table 4 shows the numerical values of the fourth embodiment. The values of f, W and $f_B$ therein are shown in the order fw, fm, fm', and ft.

The second lens group 20 and the third lens group 30 maintain the first distance d1 (4.00 mm) in the short-focal-length zooming range Zw, and maintain the second distance d2 (0.50 mm) in the long-focal-length zooming range ZT. The basic lens arrangement is the same as the first embodiment. The diaphragm S is provided 1.0 mm behind, i.e., toward the image plane from, the third lens group 30 (surface No. 10).

TABLE 4

$F_{NO}$ = 1:5.0 – 11.9 – 8.8 – 12.5
f = 39.00 – 110.75 – 110.75 – 200.59
W = 28.2 – 11.0 – 10.7 – 6.1
$f_B$ = 9.48 – 52.00 – 40.72 – 84.48

| Surf. No. | r | d | $N_d$ | ν |
|---|---|---|---|---|
| 1 | −23.981 | 1.50 | 1.84666 | 23.8 |
| 2 | −38.181 | 0.10 | — | — |
| 3 | 39.917 | 3.00 | 1.61800 | 63.4 |
| 4 | −50.453 | 2.50 – 13.02 – 13.05 – 17.45 | — | — |
| 5 | −27.082 | 1.00 | 1.80400 | 46.6 |
| 6 | 11.869 | 2.62 | 1.84666 | 23.8 |
| 7 | 36.166 | 4.00 – 4.00 – 0.50 – 0.50 | — | — |
| 8 | 13.099 | 1.00 | 1.84666 | 23.8 |
| 9 | 8.712 | 5.10 | 1.58913 | 61.2 |
| 10* | −21.741 | 16.15 – 5.62 – 9.09 – 4.69 | — | — |
| 11* | 135.888 | 2.90 | 1.58547 | 29.9 |
| 12* | −39.004 | 3.47 | — | — |
| 13 | −10.128 | 1.50 | 1.72916 | 54.7 |
| 14 | 266.244 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | $0.77245 \times 10^{-4}$ | $-0.21237 \times 10^{-6}$ | — |
| 11 | 0.00 | $0.39287 \times 10^{-4}$ | $-0.11410 \times 10^{-5}$ | $0.12382 \times 10^{-7}$ |
| 12 | 0.00 | $-0.73200 \times 10^{-4}$ | $-0.77701 \times 10^{-6}$ | $-0.61450 \times 10^{-9}$ |

[Embodiment 5]

Figure 21:
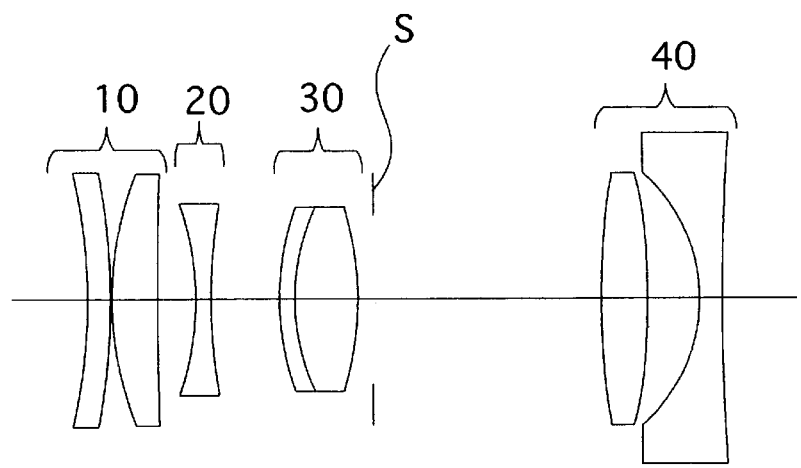
FIG. 21 is a lens arrangement of the zoom lens system according to a fifth embodiment of the present invention.
Figures 22A, 22B, 22C, 22D:
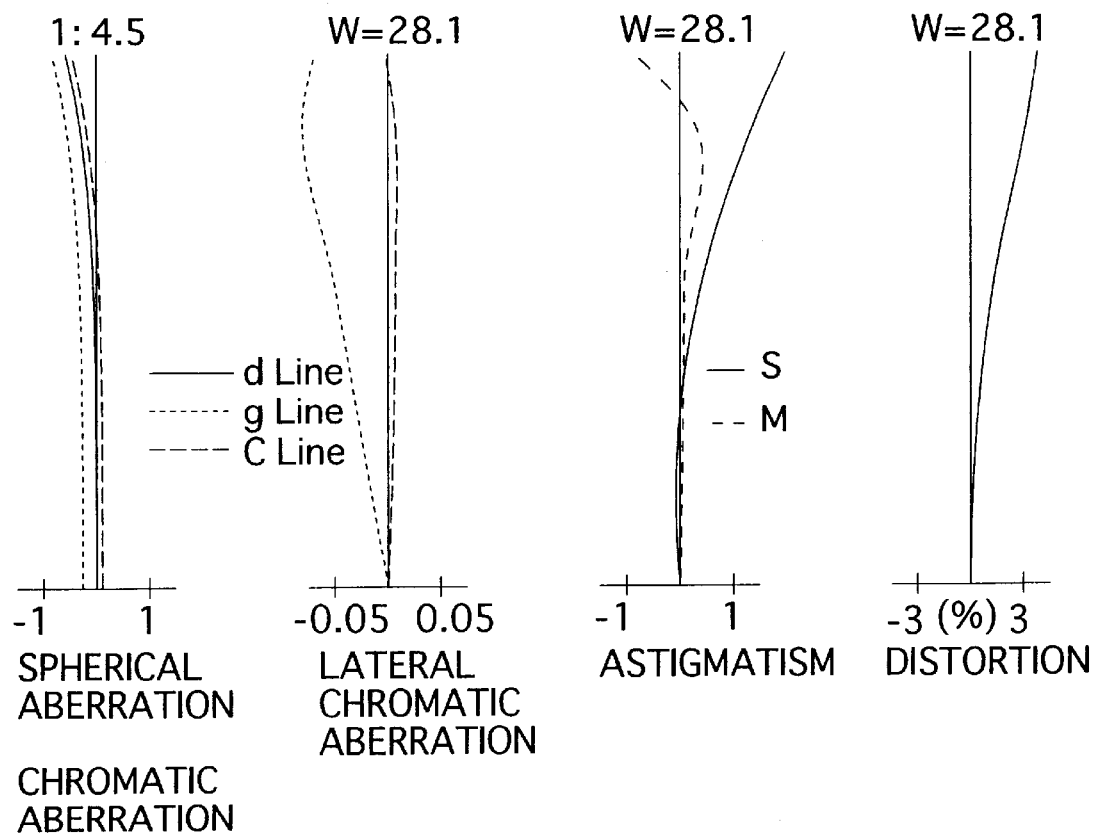
FIGS. 22A, 22B, 22C and 22D show aberrations occurred in the lens arrangement shown in FIG. 21 at the short focal length extremity.

FIGS. 21 through 24D show the fifth embodiment of the zoom lens system. Unlike the first through fourth embodiments, the fifth embodiment is applied to a zoom lens system having the lens-group moving paths shown in FIG. 30. FIG. 21 is the lens arrangement of the zoom lens system according to the fifth embodiment. FIGS. 22A to 22D show aberrations occurred in the lens arrangement shown in FIG. 21 at the short focal length extremity fw. FIGS. 23A to 23D show aberrations occurred in the lens arrangement shown in FIG. 21 at an intermediate focal length fm. FIGS. 24A to 24D show aberrations occurred in the lens arrangement shown in FIG. 21 at the long focal length extremity ft. Table 5 shows the numerical values of the fifth embodiment. The diaphragm S is provided 1.0 mm behind, i.e., toward the image plane from, the third lens group 30 (surface No. 10).

Surface Nos. 1 through 4 designate the first lens group 10, surface Nos. 5 and 6 designate the second lens group 20, surface Nos. 7 through 9 designate the third lens group 30, and surface Nos. 10 through 13 designate the fourth lens group 40. The diaphragm S is provided 1.0 mm behind, i.e., toward the image plane from, the third lens group 30 (surface No. 10).

The first lens group 10 includes a negative lens element and a positive lens element, in this order from the object. The second lens group 20 includes a negative biconcave lens element. The third lens group 30 includes cemented lens elements having a negative meniscus lens with the convex surface facing toward the object, and a positive lens element, in this order from the object. The fourth lens group 40 includes a positive lens element and a negative lens element, in this order from the object.

TABLE 5

$F_{NO}$ = 1:4.5 – 7.5 – 12.4
f = 39.00 – 109.78 – 195.70
W = 28.1 – 10.9 – 6.2
$f_B$ = 9.30 – 43.14 – 84.30

| Surf. No. | r | d | $N_d$ | ν |
|---|---|---|---|---|
| 1 | −35.287 | 1.50 | 1.84666 | 23.8 |
| 2 | −44.491 | 0.10 | — | — |
| 3 | 22.080 | 3.00 | 1.49700 | 81.6 |
| 4 | 323.124 | 2.50 – 14.45 – 17.45 | — | — |
| 5 | −18.846 | 1.00 | 1.61800 | 63.4 |
| 6 | 36.620 | 4.50 – 1.99 – 1.00 | — | — |
| 7 | 17.807 | 1.00 | 1.84666 | 23.8 |
| 8 | 14.088 | 4.20 | 1.58913 | 61.2 |
| 9* | −18.408 | 15.99 – 6.20 – 2.78 | — | — |
| 10* | 67.766 | 3.00 | 1.58547 | 29.9 |
| 11* | −63.481 | 3.45 | — | — |
| 12 | −10.956 | 1.50 | 1.72916 | 54.7 |
| 13 | 156.316 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 9 | 0.00 | $0.71252 \times 10^{-4}$ | $-0.14086 \times 10^{-6}$ | — |
| 10 | 0.00 | $0.51542 \times 10^{-4}$ | $-0.73993 \times 10^{-6}$ | $0.86383 \times 10^{-8}$ |
| 11 | 0.00 | $-0.48855 \times 10^{-4}$ | $-0.33759 \times 10^{-6}$ | — |

[Embodiment 6]

FIGS. 25 through 28D show the sixth embodiment of the zoom lens system. Similar to the fifth embodiment, the sixth embodiment is applied to a zoom lens system having the lens-group moving paths shown in FIG. 30. FIG. 25 is the lens arrangement of the zoom lens system according to the fifth embodiment. FIGS. 26A to 26D show aberrations occurred in the lens arrangement shown in FIG. 25 at the short focal length extremity fw. FIGS. 27A to 27D show aberrations occurred in the lens arrangement shown in FIG. 25 at an intermediate focal length fm. FIGS. 28A to 28D show aberrations occurred in the lens arrangement shown in FIG. 25 at the long focal length extremity ft. Table 6 shows the numerical values of the sixth embodiment. The basic lens arrangement is the same as the fifth embodiment. The diaphragm S is provided 1.11 mm behind, i.e., toward the image plane from, the third lens group 30 (surface No. 10).

TABLE 6

$F_{NO}$ = 1:5.0 – 8.2 – 13.0
f = 39.00 – 110.21 – 193.47
W = 28.5 – 10.9 – 6.3
$f_B$ = 10.11 – 45.60 – 88.61

| Surf. No. | r | d | $N_d$ | ν |
|---|---|---|---|---|
| 1 | −36.273 | 1.50 | 1.84666 | 23.8 |
| 2 | −66.961 | 0.10 | — | — |
| 3 | 29.300 | 3.00 | 1.61800 | 63.4 |
| 4 | −156.873 | 2.50 – 14.48 – 17.45 | — | — |
| 5 | −28.092 | 2.60 | 1.88300 | 40.8 |
| 6 | 12.945 | 2.30 | 1.84666 | 23.8 |
| 7 | 80.376 | 5.00 – 2.13 – 1.50 | — | — |
| 8 | 17.411 | 1.00 | 1.84666 | 23.8 |
| 9 | 10.438 | 6.00 | 1.69680 | 55.5 |
| 10* | 28.163 | 15.86 – 7.48 – 4.41 | — | — |
| 11* | −148.286 | 2.90 | 1.74077 | 27.8 |
| 12* | −35.297 | 3.35 | — | — |

TABLE 6-continued $F_{NO}$ = 1:5.0 – 8.2 – 13.0
f = 39.00 – 110.21 – 193.47
W = 28.5 – 10.9 – 6.3
$f_B$ = 10.11 – 45.60 – 88.61

| Surf. No. | r | d | $N_d$ | ν |
|---|---|---|---|---|
| 13 | −11.311 | 1.50 | 1.72916 | 54.7 |
| 14 | 226.231 | — | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 10 | 0.00 | 0.44473 × 10⁻⁴ | −0.93328 × 10⁻⁷ | — |
| 11 | 0.00 | 0.17693 × 10⁻⁴ | −0.24582 × 10⁻⁶ | 0.34384 × 10⁻⁸ |
| 12 | 0.00 | −0.43961 × 10⁻⁴ | −0.14116 × 10⁻⁶ | — |

Numerical values of each condition of each corresponding embodiment are shown in Table 7.

TABLE 7

| | Embod. 1 | Embod. 2 | Embod. 3 | Embod. 4 | Embod. 5 | Embod. 6 |
|---|---|---|---|---|---|---|
| Cond. (1) | 1.432 | 1.438 | 1.320 | 1.600 | 1.596 | 1.391 |
| Cond. (2) | 0.371 | 0.380 | 0.346 | 0.352 | 0.274 | 0.433 |
| Cond. (3) | 0.018 | 0.018 | 0.015 | 0.017 | 0.018 | 0.018 |
| Cond. (4) | −0.125 | −0.127 | −0.158 | −0.120 | −0.180 | −0.187 |
| Cond. (5) | −8.663 | −8.551 | −7.681 | −10.168 | −9.787 | −8.861 |
| Cond. (6) | 0.870 | 0.773 | 0.576 | 0.822 | 1.481 | — |
| Cond. (7) | 3.828 | 3.722 | 3.642 | 3.250 | 3.469 | — |
| Cond. (8) | 3.631 | 3.521 | 3.410 | 3.056 | 3.270 | — |

As can be understood from Table 7, the numerical values of the first through, sixth embodiments satisfy conditions (1) through (5); and the first through fifth embodiments further satisfy conditions (6) through (8). Furthermore, as can be understood from the aberration diagrams, the various aberrations are adequately corrected.

According to the above descriptions, a miniaturized zoom lens system with a higher zoom ratio, which can achieve suitable optical performance over the entire focal length ranges, in spite of a small number in lens elements of the zoom lens system, can be obtained. These features can be attained by making the overall length of the zoom lens system at the long focal length extremity shorter, and making the diameter of the front (most object-side) lens group smaller.

Furthermore, a miniaturized zoom lens system of the four-lens-group arrangement, i.e., a positive lens group, a negative lens group, a positive lens group and a negative lens group in this order from the object, which (i) is advantageously small for manufacturing, (ii) can reduce the focusing sensitivity tends to become larger in the internal lens groups (the second and the third lens groups), and (iii) has a higher zoom ratio, can be obtained.

What is claimed is:

1. A zoom lens system comprising a positive first lens group, a negative second lens group, a positive third lens group and a negative fourth lens group in this order from an object, wherein:

zooming is performed by moving each of said first through fourth lens groups in the optical axis direction; and said zoom lens system satisfies the following conditions:

$1.1 < f_{23T}/f_{23W} < 1.8$ $0.2 < LD_{23W}/f_W < 0.45$ $0.01 < (D_{23W} - D_{23T})/f_T < 0.05$ $0.1 < |r1/f_T| < 0.25 (r1 < 0)$ $6.0 < |f_T/f_2| < 12.0 (f_2 < 0)$ wherein $f_{23W}$ designates the combined focal length of said second and third lens groups at the short focal length extremity;

$f_{23T}$ designates the combined focal length of said second and third lens groups at the long focal length extremity;

$LD_{23W}$ designates the distance between the most object-side surface of said second lens group and the most image-side surface of said third lens group at the short focal length extremity;

fw designates the focal length of aid entire zoom lens system at the short focal length extremity;

$D_{23W}$ designates the axial air-distance between said second lens group and said third lens group at the short focal length extremity;

$D_{23T}$ designates the axial air-distance between said second lens group and said third lens group at the long focal length extremity;

$f_T$ designates the focal length of the entire zoom lens system at the long focal length extremity;

r1 designates the radius of curvature of the most object-side surface of said first lens group; and $f_2$ designates the focal length of said second lens group.

2. A zoom lens system comprising a positive first lens group, a negative second lens group, a positive third lens group and a negative fourth lens group in this order from an object, wherein:

zooming is performed by moving each of said first through fourth lens groups in the optical axis direction;

the traveling distances of aid first and fourth lens groups are the same upon zooming; and said zoom lens system satisfies the following conditions:

$1.1 < f_{23T}/f_{23W} < 1.8$ $0.2 < LD_{23W}/f_W < 0.45$ $0.01 < (D_{23W} - D_{23T})/f_T < 0.05$ wherein $f_{23W}$ designates the combined focal length of said second and third lens groups at the short focal length extremity;

$f_{23T}$ designates the combined focal length of said second and third lens groups at the long focal length extremity;

LD$_{23W}$ designates the distance between the most object-side surface of said second lens group and the most image-side surface of sa d third lens group at the short focal length extremity;

fw designates the focal length of aid entire zoom lens system at the short focal length extremity;

D$_{23W}$ designates the axial air-distance between said second lens group and said third lens group at the short focal length extremity;

D$_{23T}$ designates the axial air-distance between said second lens group and said third lens group at the long focal length extremity; and f$_T$ designates the focal length of the entire zoom lens system at the long focal length extremity.

3. A zoom lens system comprising a positive first lens group, a negative second lens group, a positive third lens group and a negative fourth lens group in this order from an object, wherein:

zooming is performed by moving each of said first through fourth lens groups in the optical axis direction;

focusing is performed by integrally moving said second lens group and said third lens group; and said zoom lens system satisfies the following conditions:

$$1.1 < f_{23T}/f_{23W} < 1.8$$

$$0.2 < LD_{23W}/fw < 0.45$$

$$0.01 < (D_{23W} - D_{23T})/f_T < 0.05$$

wherein f$_{23W}$ designates the combined focal length of said second and third lens groups at the short focal length extremity;

f$_{23T}$ designates the combined focal length of said second and third lens groups at the long focal length extremity;

LD$_{23W}$ designates the distance between the most object-side surface of said second lens group and the most image-side surface of sa d third lens group at the short focal length extremity;

fw designates the focal length of aid entire zoom lens system at the short focal length extremity;

D$_{23W}$ designates the axial air-distance between said second lens group and said third lens group at the short focal length extremity;

D$_{23T}$ designates the axial air-distance between said second lens group and said third lens group at the long focal length extremity; and f$_T$ designates the focal length of said entire zoom lens system at the long focal length extremity.

4. A zoom lens system comprising a positive first lens group, a negative second lens group, a positive third lens group and a negative fourth lens group in this order from an object, wherein:

zooming is performed by moving each of said first through fourth lens groups in the optical axis direction;

the traveling distances of said first and fourth lens groups are the same upon zooming; and said zoom lens system satisfies the following conditions:

$$0.4 < \{(f_T/f_{12T})^2 - (f_T/f_1)^2\}/\{(f_T/f_{123T})^2 - (f_T/f_{12T})^2\} < 1.6$$

wherein f$_T$ designates the focal length of said entire zoom lens system at the long focal length extremity;

f$_1$ designates the focal length of said first lens group;

f$_{12T}$ designates the combined focal length of said first lens group and said second lens group at the long focal length extremity; and f$_{123T}$ designates the combined focal length of said first lens group, said second lens group and said third lens group at the long focal length extremity.

5. A zoom lens system according to claim 4, satisfying the following conditions:

$$3.0 < [\{(f_T/f_{12T})^2 - (f_T/f_1)^2\} + \{(f_T/f_{123T})^2 - (f_T/f_{12T})^2\}]/Z < 4.0$$

wherein

Z=f$_T$/f$_W$; and fw designates the focal length of aid entire zoom lens system at the short focal length extremity.

6. A zoom lens system according to claim 4, satisfying the following condition:

$$2.5 < (f_T/f_1)^2 + 1 - (f_T/f_{123T})^2 |/Z < 4.0.$$

7. A zoom lens system comprising a positive first lens group, a negative second lens group, a positive third lens group and a negative fourth lens group in this order from an object, wherein:

zooming is performed by moving each of said first through fourth lens groups in the optical axis direction;

focusing is performed by integrally moving said second lens group and said third lens group; and said zoom lens system satisfies the following conditions:

$$0.4 < \{(f_T/f_{12T})^2 - (f_T/f_1)^2\}/\{(f_T/f_{123T})^2 - (f_T/f_{12T})^2\} < 1.6$$

wherein f$_T$ designates the focal length of said entire zoom lens system at the long focal length extremity;

f$_1$ designates the focal length of said first lens group;

f$_{12T}$ designates the combined focal length of said first lens group and said second lens group at the long focal length extremity; and f$_{123T}$ designates the combined focal length of said first lens group, said second lens group and said third lens group at the long focal length extremity.

8. A zoom lens system according to claim 7, satisfying the following conditions:

$$3.0 < [\{(f_T/f_{12T})^2 - (f_T/f_1)^2\} + \{(f_T/f_{123T})^2 - (f_T/f_{12T})^2\}]/Z < 4.0$$

wherein

Z=f$_T$/f$_W$; and fw designates the focal length of aid entire zoom lens system at the short focal length extremity.

* * * * *